US011911978B2

(12) United States Patent
Moore et al.

(10) Patent No.: US 11,911,978 B2
(45) Date of Patent: Feb. 27, 2024

(54) METHODS AND ASSOCIATED SYSTEMS FOR MANUFACTURING COMPOSITE BARREL STRUCTURES

(71) Applicant: The Boeing Company, Chicago, IL (US)

(72) Inventors: Matthew B. Moore, Salem, OR (US); Patrick B. Stone, Monroe, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/714,274

(22) Filed: Apr. 6, 2022

(65) Prior Publication Data

US 2022/0355553 A1 Nov. 10, 2022

Related U.S. Application Data

(60) Provisional application No. 63/185,443, filed on May 7, 2021.

(51) Int. Cl.
  *B29C 70/38* (2006.01)
  *B29C 70/54* (2006.01)
  *B29L 31/00* (2006.01)

(52) U.S. Cl.
  CPC ............ *B29C 70/382* (2013.01); *B29C 70/54* (2013.01); *B29C 70/545* (2013.01); *B29L 2031/7154* (2013.01)

(58) Field of Classification Search
  CPC ..... B29C 70/382; B29C 70/54; B29C 70/545; B29C 70/30; B29C 70/42; B29L 2031/7154; B29L 2031/3082; B64C 1/12; B64C 2001/0072; B64F 5/10; B29D 99/001; Y02T 50/40
  See application file for complete search history.

(56) References Cited

U.S. PATENT DOCUMENTS

| 8,765,042 B2 | 7/2014 | Frauen et al. |
| 8,789,837 B2 | 7/2014 | Chang et al. |
| 9,511,548 B1 | 12/2016 | Rotter et al. |

(Continued)

OTHER PUBLICATIONS

European Patent Office, Extended European Search Report, App. No. 22168763.5 (dated Sep. 8, 2022).

*Primary Examiner* — Sarang Afzali
*Assistant Examiner* — Darrell C Ford
(74) *Attorney, Agent, or Firm* — Walters & Wasylyna LLC

(57) ABSTRACT

A method for manufacturing a composite barrel structure includes fabricating a first plurality of composite panels that are assemblable into a first partial composite barrel section. The fabricating includes assembling a first layup of composite material and, concurrently, assembling at least one additional layup. The fabricating further includes heating the first layup with the at least one additional layup. A system for fabricating a plurality of panels that are assemblable into partial barrel sections includes a first workstation for fabricating a first plurality of composite panels that are assemblable into a first partial composite barrel section. The first workstation includes a first assembly station configured to concurrently assemble a first layup of composite material and at least one additional layup and a first heating station configured to heat the first layup concurrently with the at least one additional layup to yield the first plurality of composite panels.

20 Claims, 27 Drawing Sheets

(56) References Cited

U.S. PATENT DOCUMENTS

| | | | |
|---|---|---|---|
| 10,293,576 B2* | 5/2019 | Hasan | B64C 3/26 |
| 10,773,830 B2* | 9/2020 | Chan | B23Q 9/0007 |
| 11,597,167 B2* | 3/2023 | Louie | B29C 70/38 |
| 2006/0108058 A1* | 5/2006 | Chapman | B64F 5/10 |
| | | | 156/245 |
| 2008/0230652 A1* | 9/2008 | Biornstad | B29C 70/382 |
| | | | 244/120 |
| 2009/0148647 A1 | 6/2009 | Jones et al. | |
| 2010/0011580 A1* | 1/2010 | Brennan | B29C 70/30 |
| | | | 29/700 |
| 2012/0312922 A1* | 12/2012 | Rosman | B32B 5/26 |
| | | | 244/119 |
| 2014/0001311 A1* | 1/2014 | Dopker | B64C 1/069 |
| | | | 156/182 |
| 2015/0064391 A1* | 3/2015 | Trondl | B29C 70/865 |
| | | | 156/60 |
| 2015/0083860 A1* | 3/2015 | Frauen | B64C 1/068 |
| | | | 244/119 |
| 2016/0257427 A1* | 9/2016 | Humfeld | B29C 66/12841 |
| 2020/0331634 A1 | 10/2020 | Knutson et al. | |
| 2022/0152759 A1* | 5/2022 | Smith | B23P 21/004 |
| 2023/0278297 A1* | 9/2023 | Carlson | B29C 70/462 |
| | | | 264/241 |

* cited by examiner

FIG. 13

SYSTEM 600

FIRST WORKSTATION 200
FIRST ASSEMBLY STATION 210
FIRST HEATING STATION 220
FIRST TRIMMING STATION 225
FIRST WASHING STATION 230
FIRST INSPECTION STATION 237
FIRST PAINTING STATION 240
FIRST CURE STATION 240a
FIRST JOINING STATION 250

SECOND WORKSTATION 300
SECOND ASSEMBLY STATION 310
SECOND HEATING STATION 320
SECOND TRIMMING STATION 325
SECOND WASHING STATION 330
SECOND INSPECTION STATION 337
SECOND PAINTING STATION 340
SECOND CURE STATION 340a
SECOND JOINING STATION 350

THIRD WORKSTATION 400
THIRD ASSEMBLY STATION 410
THIRD HEATING STATION 420
THIRD TRIMMING STATION 425
THIRD WASHING STATION 430
THIRD INSPECTION STATION 437
THIRD PAINTING STATION 440
THIRD CURE STATION 440a
THIRD JOINING STATION 450

FOURTH WORKSTATION 500
FOURTH ASSEMBLY STATION 510
FOURTH HEATING STATION 520
FOURTH TRIMMING STATION 525
FOURTH WASHING STATION 530
FOURTH INSPECTION STATION 537
FOURTH PAINTING STATION 540
FOURTH CURE STATION 540a
FOURTH JOINING STATION 550

TRANSPORT SYSTEM 610
FULL JOINING STATION 275
HOLDING FIXTURE 615
MECHANICAL PRESS 231

FIRST PLURALITY OF COMPOSITE PANELS 710
FIRST LAYUP OF COMPOSITE MATERIAL 715
ADDITIONAL FIRST LAYUP OF COMPOSITE MATERIAL 717
FIRST PARTIAL BARREL SECTION 712

SECOND PLURALITY OF COMPOSITE PANELS 720
SECOND LAYUP OF COMPOSITE MATERIAL 725
ADDITIONAL SECOND LAYUP OF COMPOSITE MATERIAL 727
SECOND PARTIAL BARREL SECTION 722

COMPOSITE BARREL STRUCTURE 700
FULL BARREL STRUCTURE 750
COMPUTER 900
NUMERICAL CONTROL PROGRAM 910
AUTOMATED FIBER PLACEMENT MACHINE 205a
COMPOSITE MATERIAL 229

FIRST SURFACE 207
SECOND SURFACE 209
POSITIONS 217
MANDREL 213
TOOL 215

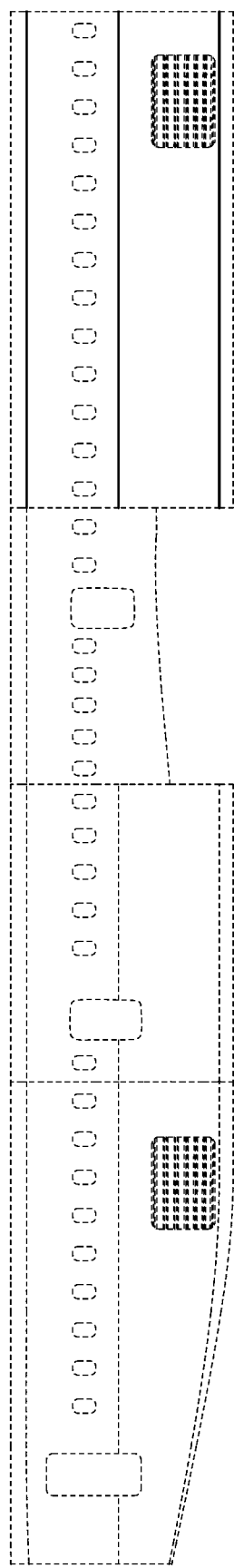

METHODS AND ASSOCIATED SYSTEMS FOR MANUFACTURING COMPOSITE BARREL STRUCTURES

PRIORITY

This application claims priority from U.S. Ser. No. 63/185,443 filed on May 7, 2021, the entire contents of which are incorporated herein by reference.

FIELD

This application relates to the manufacturing of composite structures and, more specifically, to concurrent manufacturing of two or more composite barrel structures.

BACKGROUND

Manufacturing of fuselage components typically requires a large factory footprint and is time consuming. While it is desirable to achieve high laydown rates and short takt time, current advanced material and fuselage production exhibits, for example, laydown rates of less than 1000 lbs. per hour and takt times over 6 hours. Current solutions to improve laydown rates and takt time face downfalls including likelihood to impose a recurring burden on operations that are not be sustainable in the long run that represent significant technology challenges.

Accordingly, those skilled in the art continue with research and development efforts in the field of manufacturing large composite barrel structures.

SUMMARY

Disclosed are methods for manufacturing a composite barrel structure.

In one example, the disclosed method for manufacturing a composite barrel structure includes fabricating a first plurality of composite panels that are assemblable into a first partial composite barrel section. The fabricating the first plurality of composite panels includes assembling a first layup of composite material. The fabricating the first plurality of composite panels further includes, concurrently with the assembling the first layup, assembling at least one additional layup of the composite material. The fabricating the first plurality of composite panels further includes heating the first layup together with the at least one additional layup.

Also disclosed are systems for fabricating a plurality of panels that are assemblable into partial barrel sections.

In one example, the disclosed system for fabricating a plurality of panels that are assemblable into partial barrel sections includes a first workstation for fabricating a first plurality of composite panels that are assemblable into a first partial composite barrel section. The first workstation includes a first assembly station configured to concurrently assemble a first layup of composite material and at least one additional layup of the composite material. The first workstation further includes a first heating station configured to heat the first layup concurrently with the at least one additional layup to yield the first plurality of composite panels.

Other examples of the disclosed methods and systems will become apparent from the following detailed description, the accompanying drawings, and the appended claims.

Also disclosed are ornamental designs for an aircraft fuselage.

BRIEF DESCRIPTION OF THE DRAWINGS

Some examples of the present disclosure are described with reference to the accompanying drawings. The same reference number represents the same element or the same type of element on all drawings.

FIG. 13 is a block diagram of a system for fabricating a plurality of panels that are assemblable into patrial barrel sections;

FIG. 28 is a left side view of the aircraft fuselage of FIG. 25;

DETAILED DESCRIPTION

Figure 1:
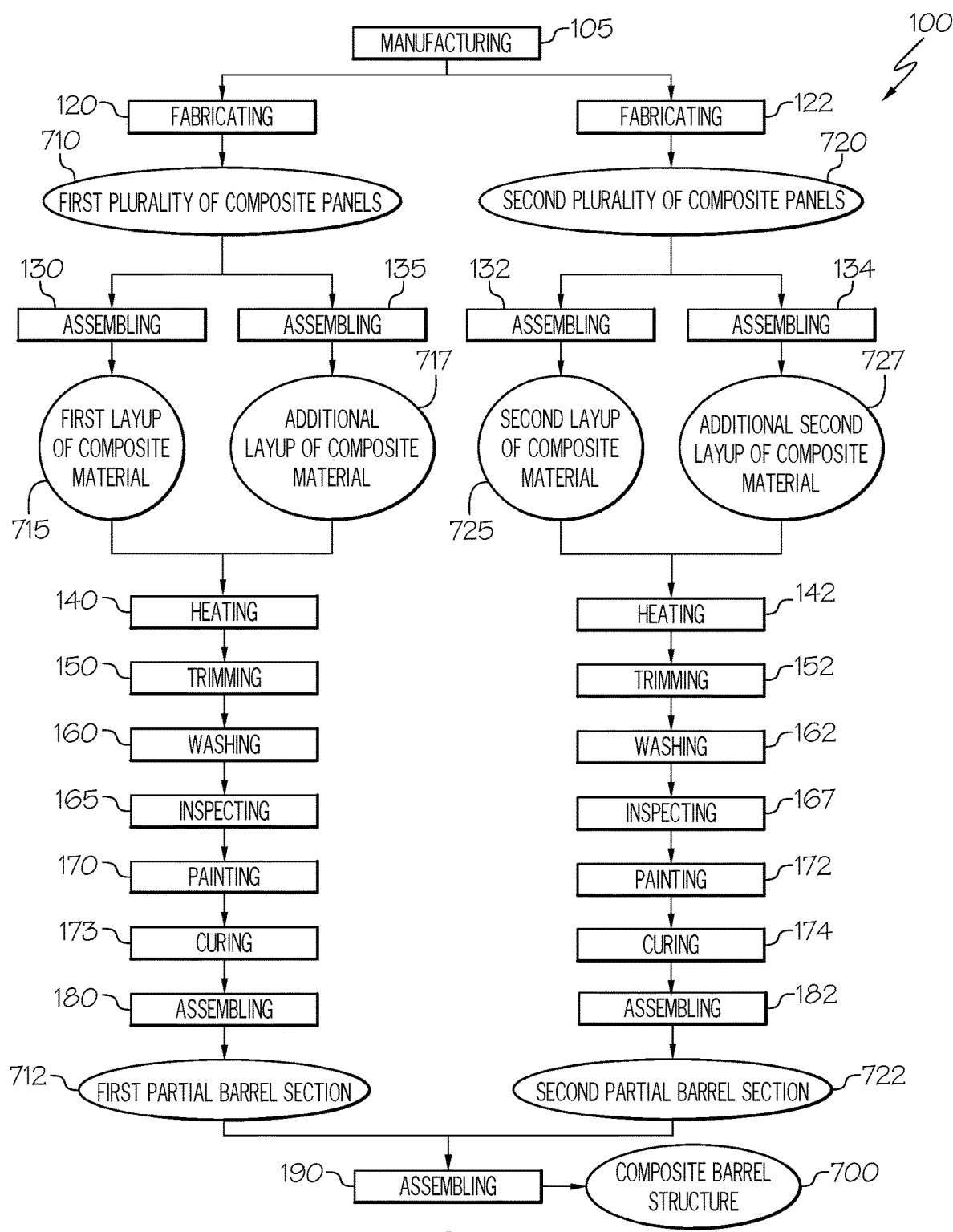
FIG. 1 is a flow chart of a method for manufacturing a composite barrel structure.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according to the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

References throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The disclosed method 100 and system 600 allow for parallel fabrication and processing of composite airplane parts to increase throughput within a reduced, compressed factory footprint. Parallel processing may allow for layup of composite material on, for example, 28 layup positions. In one example, the composite material includes thermoplastic resins. The parallel processing may include laying down a plurality of composite plies of laminate at various orientations as determined by one or more numerical control programs.

In one example, the disclosed method 100 and system 600 may increase production from a typical rate of about 15 aircrafts per month to over 80 aircrafts per month within a reduced footprint. In one example, the disclosed method 100 and system 600 utilize a panelized concept to aircraft production as opposed to an incremental pulse concept. In one example, the method 100 includes fabricating a first plurality panels in parallel and then curing the first plurality of panels in parallel prior to bolting them together to form a half barrel section.

Figure 14:
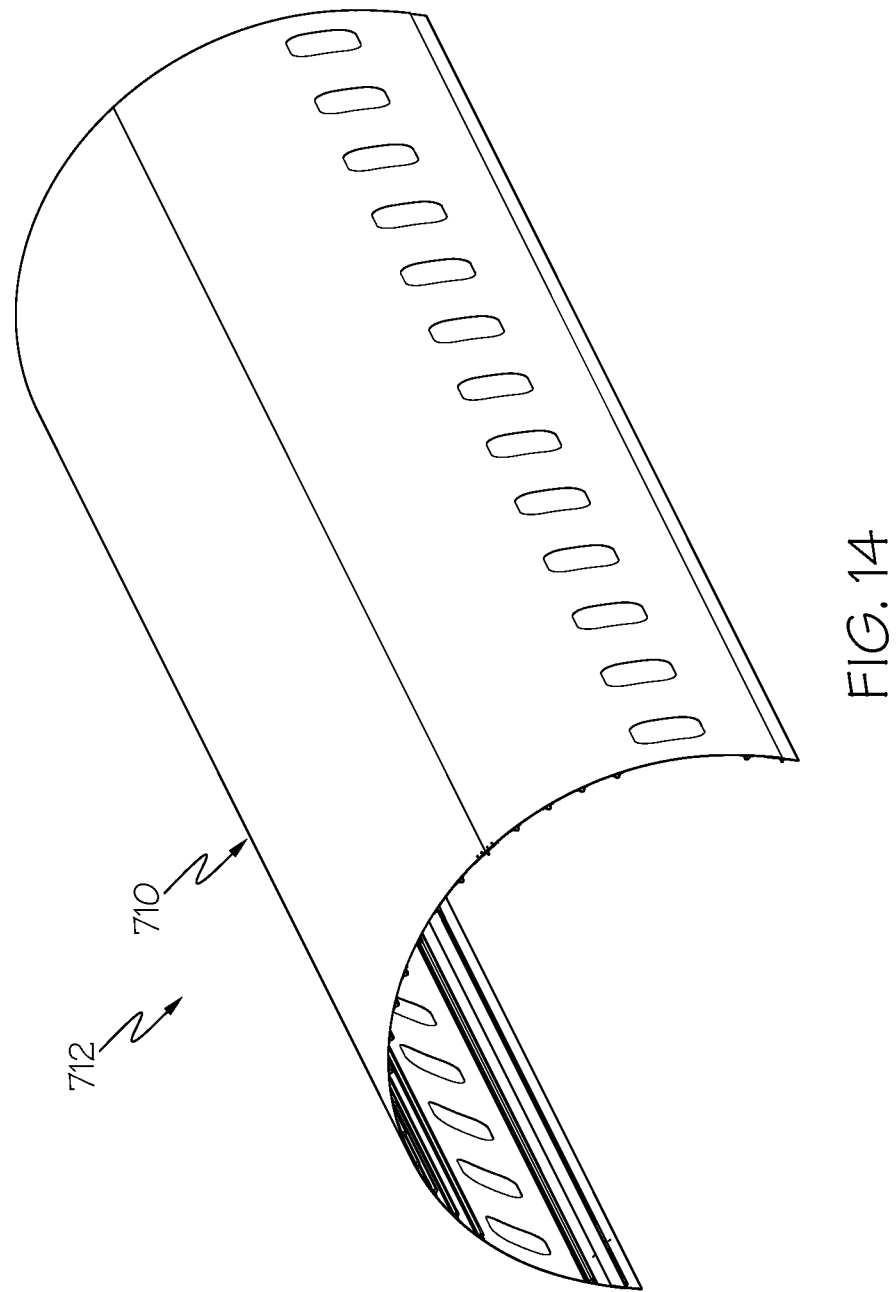
FIG. 14 is a perspective view of a partial barrel section.
Figure 15:
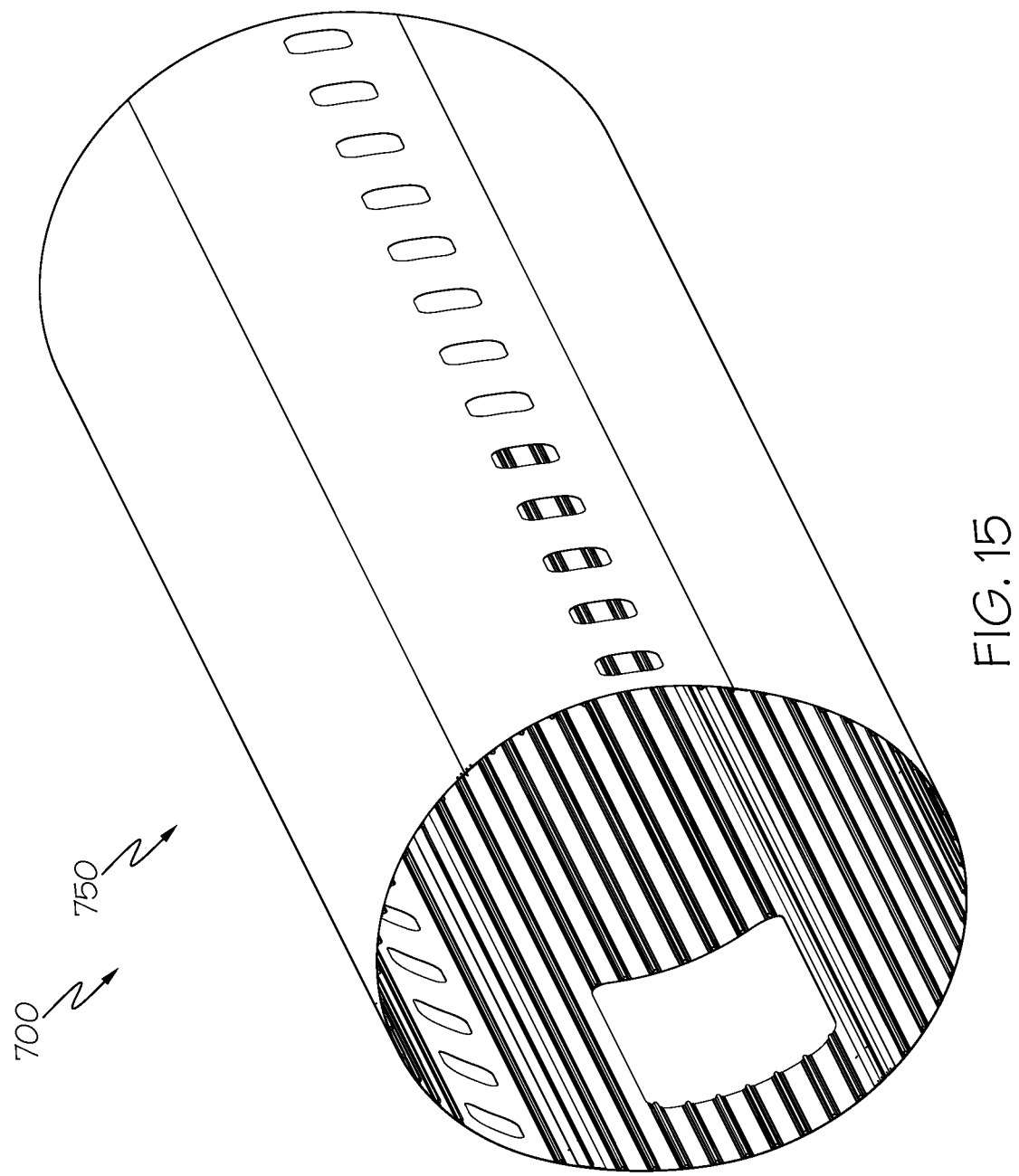
FIG. 15 is a perspective view of a full barrel structure.
Figure 16:
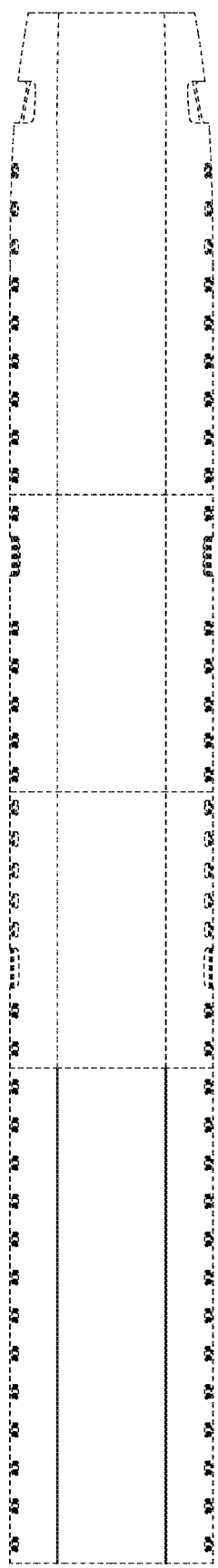
FIG 16. is a block diagram of aircraft production and service methodology.
Figure 17:
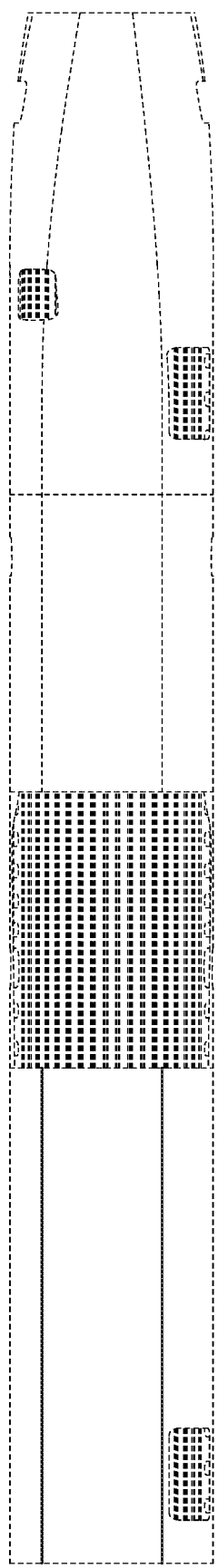
FIG. 17 is a schematic illustration of an aircraft.
Figure 18:
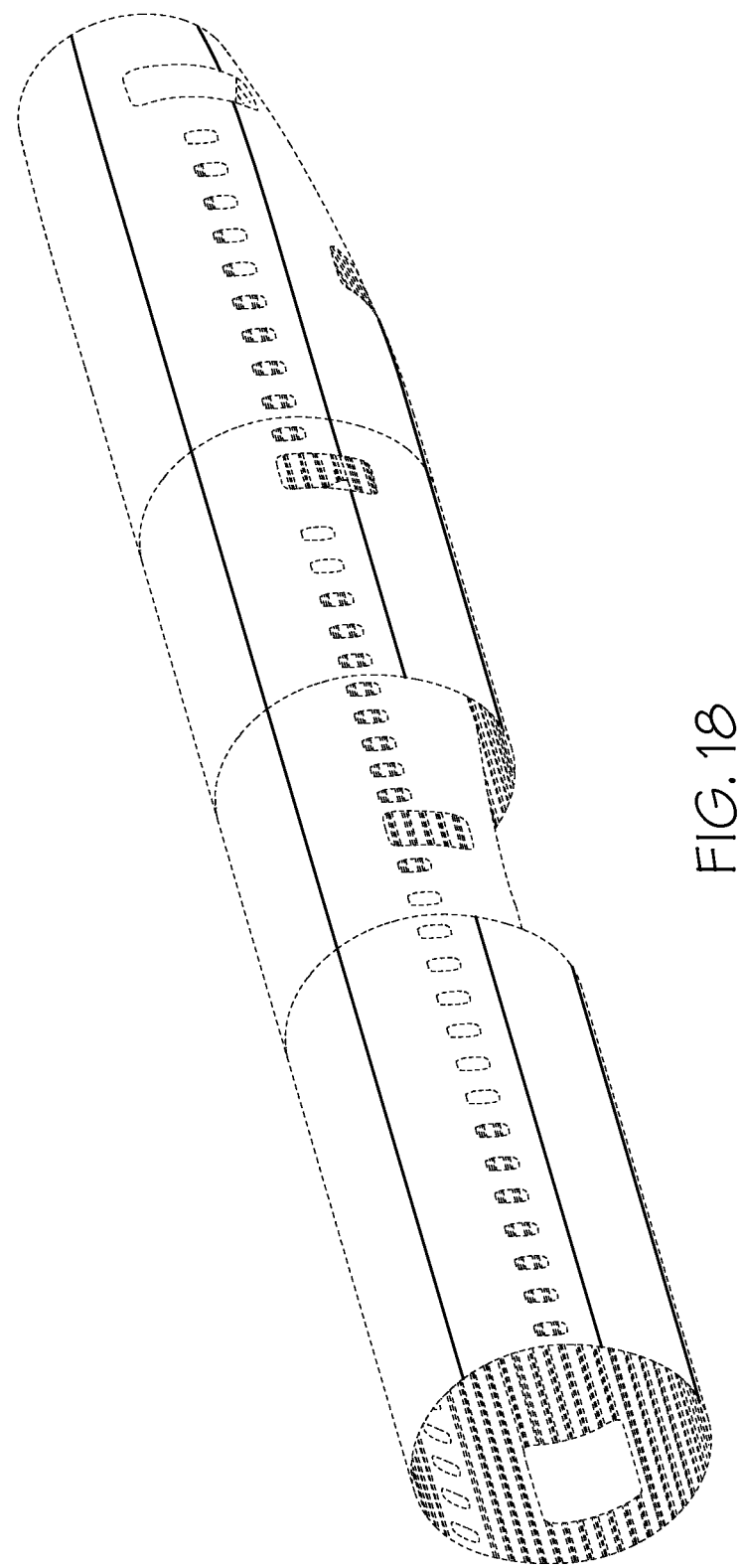
FIG. 18 is a perspective view of a first example aircraft fuselage in accordance with the disclosed design.
Figure 20:
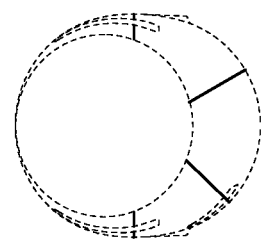
FIG. 20 is a rear elevational view of the aircraft fuselage of FIG. 18.
Figure 19:
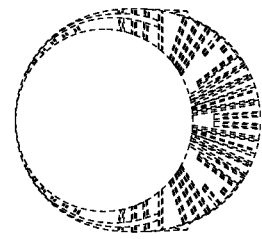
FIG. 19 is a front elevational view of the aircraft fuselage of FIG. 18.
Figure 21:
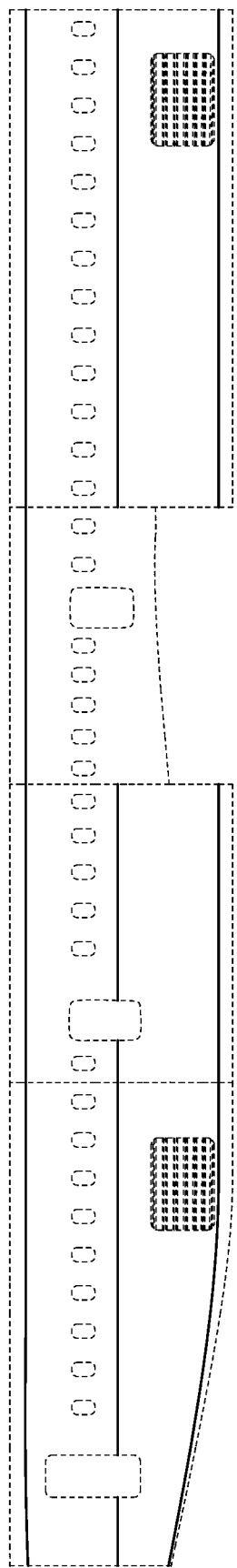
FIG. 21 is a left side view of the aircraft fuselage of FIG. 18.
Figure 22:
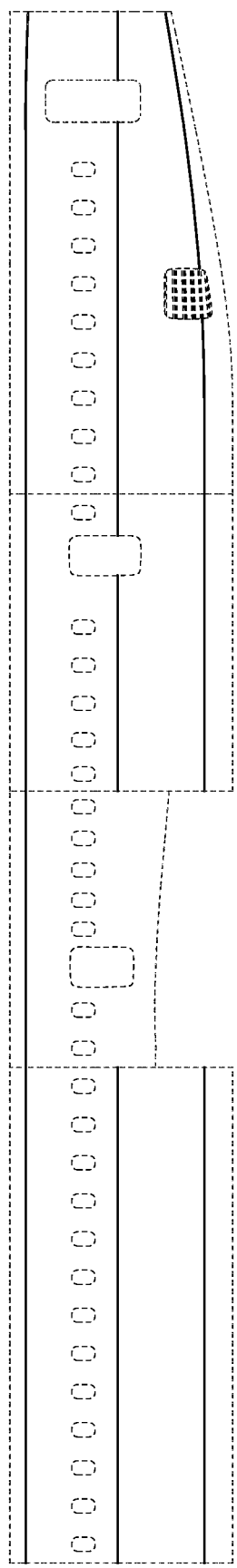
FIG. 22 is a right side view of the aircraft fuselage of FIG. 18.
Figure 23:
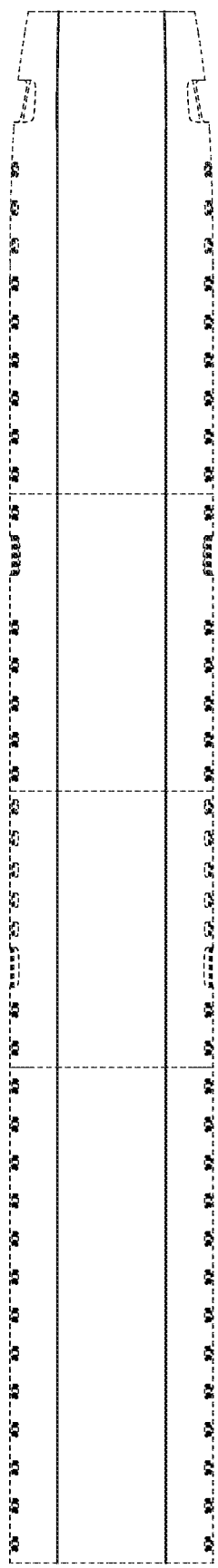
FIG. 23 is top plan view of the aircraft fuselage of FIG. 18.
Figure 24:
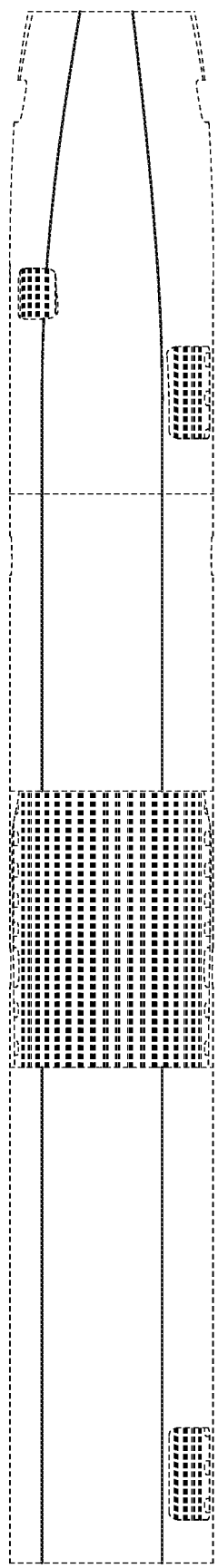
FIG. 24 is a bottom plan view of the aircraft fuselage of FIG. 18.
Figure 25:
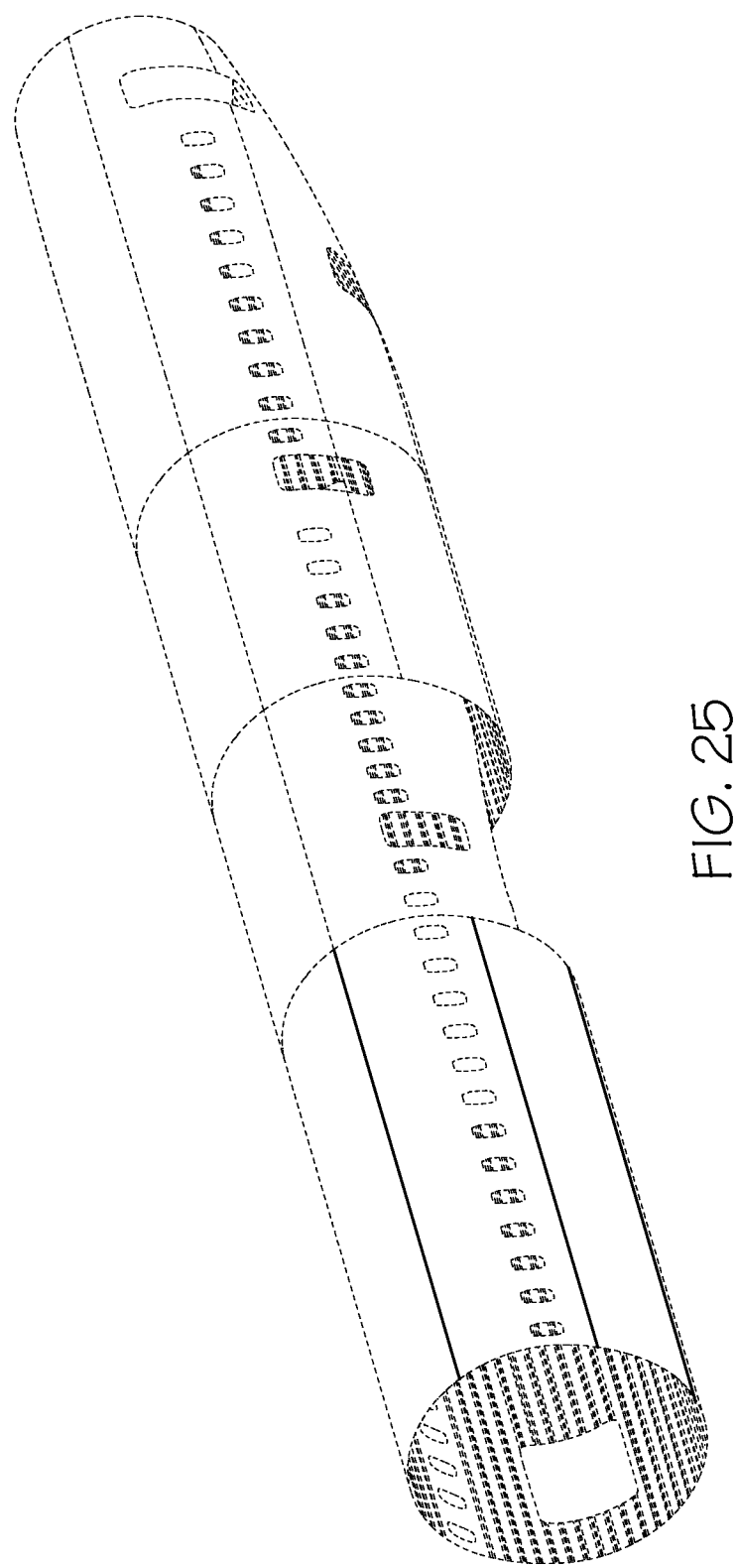
FIG. 25 is a perspective view of a second example aircraft fuselage in accordance with the disclosed design.
Figure 27:
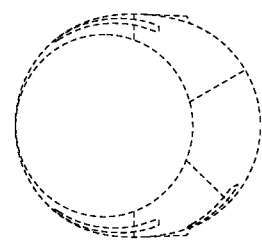
FIG. 27 is a rear elevational view of the aircraft fuselage of FIG. 25.
Figure 26:
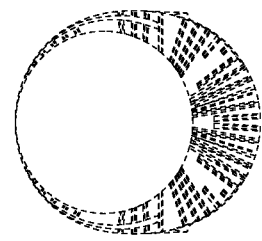
FIG. 26 is a front elevational view of the aircraft fuselage of FIG. 25.
Figure 29:
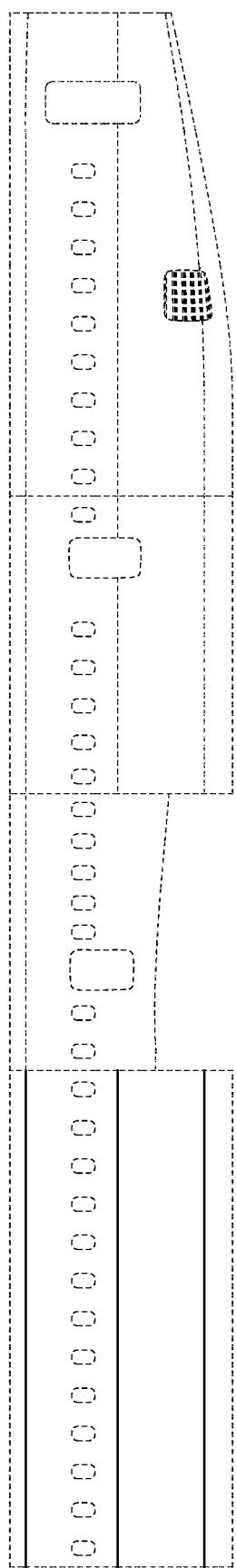
FIG. 29 is a right side view of the aircraft fuselage of FIG. 25.

Referring to FIG. 1, disclosed is a method 100 for manufacturing 105 a composite barrel structure 700, see FIG. 15. The method 100 comprises fabricating 120 a first plurality of composite panels 710. The first plurality of composite panels 710 are assemblable into a first partial composite barrel section 712, see FIG. 14. In one example, the first partial composite barrel section 712 is approximately half of a full barrel structure 750, see FIG. 15 illustrating when joined longitudinally to a counterpart half barrel section. In another example, the first partial barrel section 712 is an upper half barrel section.

Figure 2:
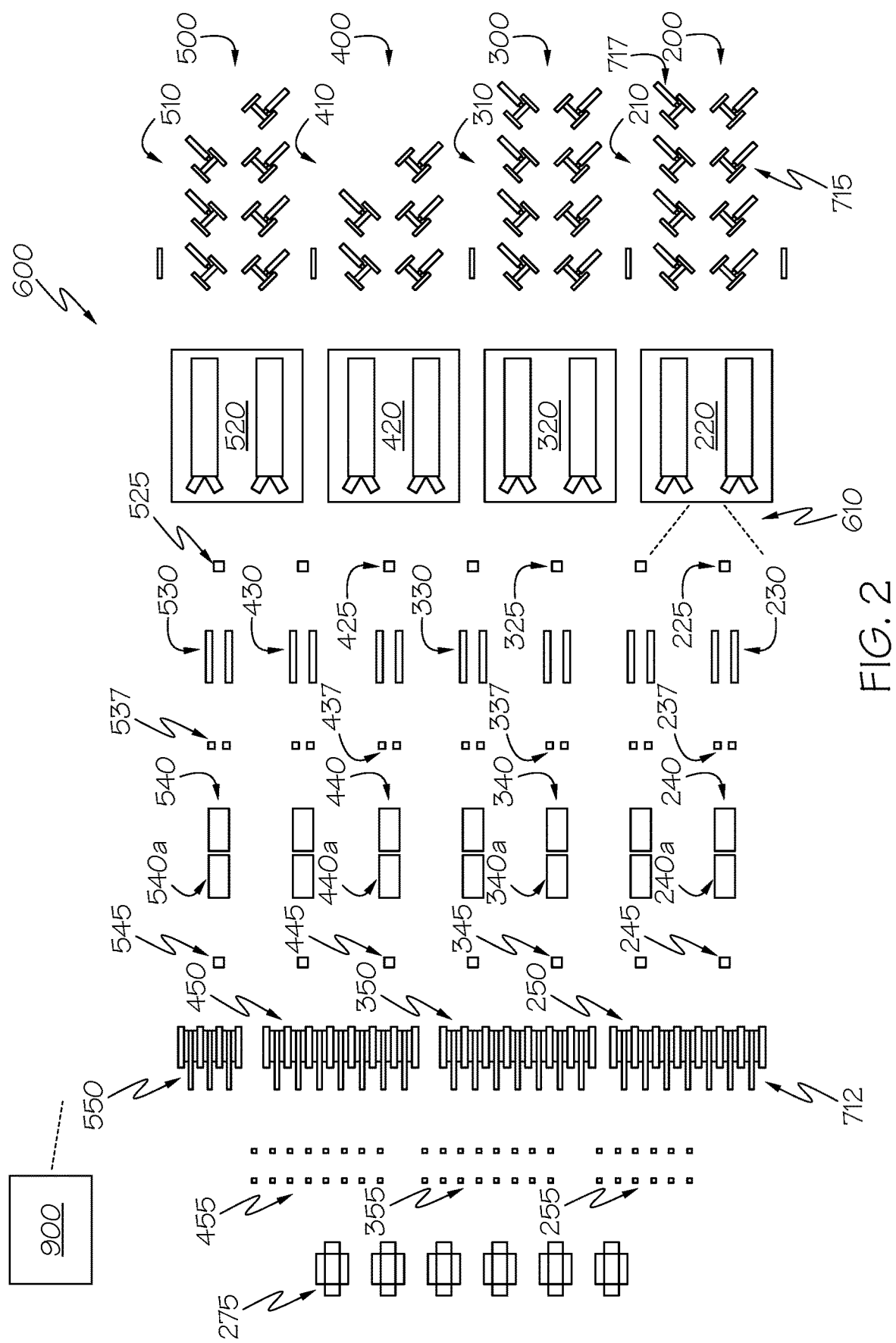
FIG. 2 is a top plan view of a system for fabricating a plurality of panels that are assemblable into partial barrel sections.
Figure 3:
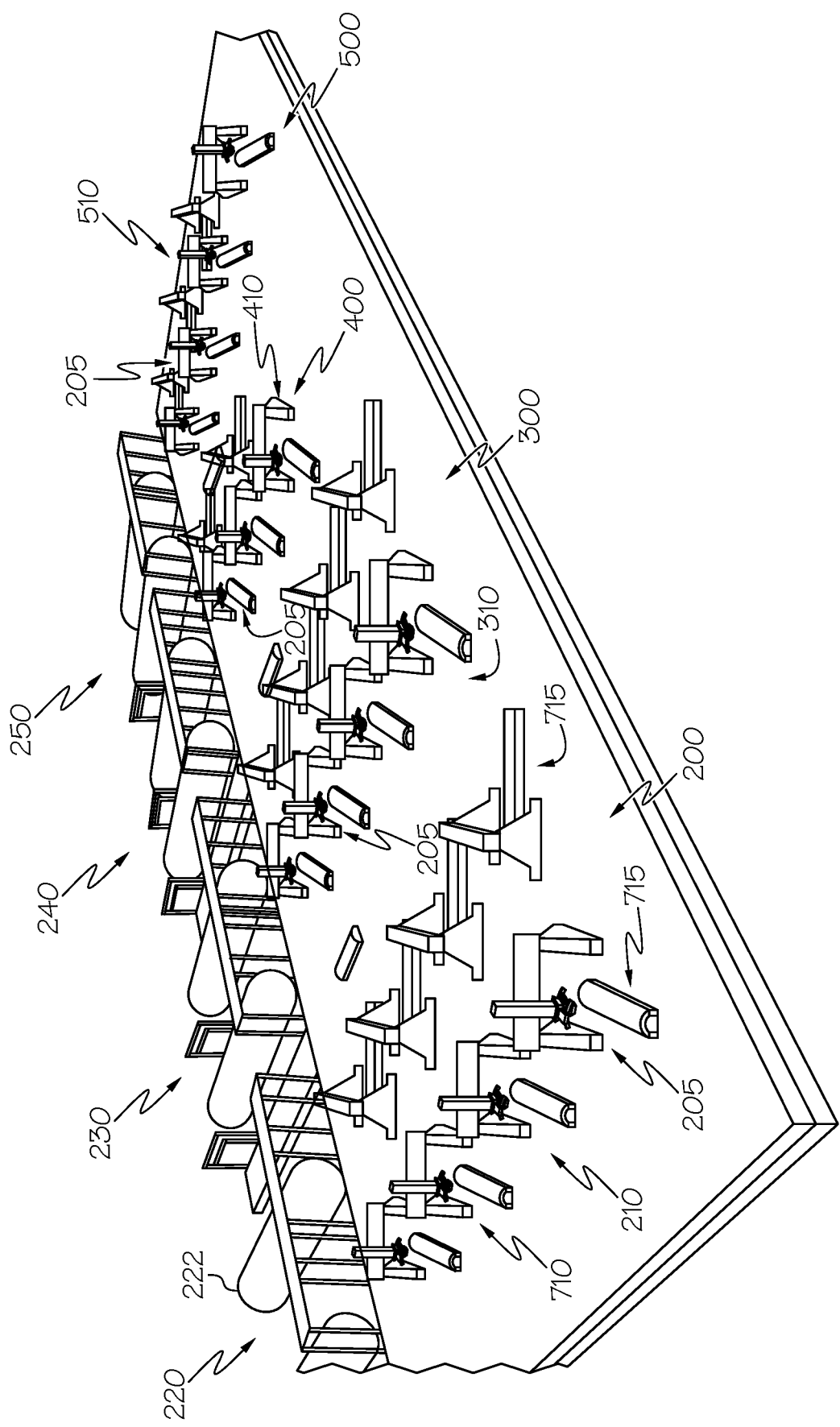
FIG. 3 is a perspective view of a portion of the system of FIG. 2.

Still referring to FIG. 1, the fabricating 120 the first plurality of composite panels 710 occurs in a first workstation 200, see FIG. 3. In one example, the fabricating 120 the first plurality of composite panels 710 is automated such that a computer 900, see FIG. 13, is in communication with the first workstation 200, see FIG. 2. The computer 900 may utilize one or more numerical control program 910 to direct fabrication and movement of the first plurality of composite panels 710 throughout the first workstation 200.

Still referring to FIG. 1, the fabricating 120 the first plurality of composite panels 710 includes assembling 130 a first layup of composite material 715. In one example, the assembling 130 a first layup of composite material utilizes at least one layup machine 205 located in a first assembly station 210, see FIG. 3, for assembling a composite preform. The assembling 130 may further include, after material layup of the first layup of composite material 715, bagging the first layup of composite material 715.

Referring to FIG. 2, the at least one layup machine 205 is configured to layup composite material 229 onto two or more first surfaces 207, see FIG. 13. In one example, the two or more first surfaces 207 include a tool 215 or mandrel 213 213. In another example, the at least one layup machine 205, see FIG. 3, is an automated fiber placement machine 205a in communication with the computer 900. In one example, each of the two or more first surfaces 207 is prepped for approximately 1 hour at 21 positions 217. Each of the two or more first surfaces 207 is configured for assembling 130 a first layup of composite material 715 to yield one panel of the first plurality of composite panels 710.

Referring to FIG. 1, the fabricating 120 the first plurality of composite panels 710 includes assembling 135 at least one additional first layup of composite material 717 concurrently with the assembling 130 the first layup of composite material 715. In one example, the assembling 135 at least one additional first layup of composite material 717 concurrently with the assembling 130 the first layup of composite material 715 utilizes at least one layup machine 205, see FIG. 3. The assembling 135 is performed such that the first layup of composite material 715 and the at least one additional first layup of composite material 717 are fabricated in parallel. The at least one layup machine 205 is configured to layup composite material 229 onto a tool 215 or mandrel 213. In one example, the at least one layup machine 205 is an automated fiber placement machine 205a in communication with the computer 900.

Referring to FIG. 1, in one or more examples, the fabricating 120 the first plurality of composite panels 710 includes assembling 135 at least two of the additional first layup of composite material 717 concurrently, in parallel with the assembling 130 the first layup of composite material 715. The assembling 130 the first layup of composite material 715 in parallel with the assembling 135 at least two of the additional first layup of composite material 717 in parallel yields three preforms for further assembling 180 into a first partial barrel section 712. In one example, the assembling 135 at least two of the additional first layup of composite material 717 concurrently with the assembling 130 the first layup of composite material 715 utilizes at least one layup machine 205, see FIG. 3. The at least one layup machine 205 is configured to layup composite material 229 onto a tool 215 or mandrel 213. In one example, the at least one layup machine 205 is an automated fiber placement machine 205a in communication with the computer 900.

Referring to FIG. 1, the fabricating 120 the first plurality of composite panels 710 includes heating 140 the first layup of composite material 715 together with the at least one additional layup of composite material 717. In one example, the heating 140 comprises applying pressure to the first layup of composite material 715 and the at least one additional layup of composite material 717. In another example, the heating 140 comprises pneumatically applying pressure to the first layup of composite material 715 and the at least one additional layup of composite material 717. In yet another example, the heating 140 comprises mechanically applying pressure to the first layup of composite material 715 and the at least one additional layup of composite material 717.

The heat and pressure would be compressive force during layup of the preform often applied by roller after the composite material 229 is placed upon the mandrel 213 and/or the prior placed layer, however, there are a number of ways contemplated to apply the heat during the layup including, heaters, infrared or any other suitable means. After preform completion, the first plurality of composite panels 710 are, in parallel, bagged and inserted into the autoclave 222 to be heated/cured to form a composite fuselage panel structure prepared for further processing including, for example, trimming, washing, inspecting and painting.

Figure 4:
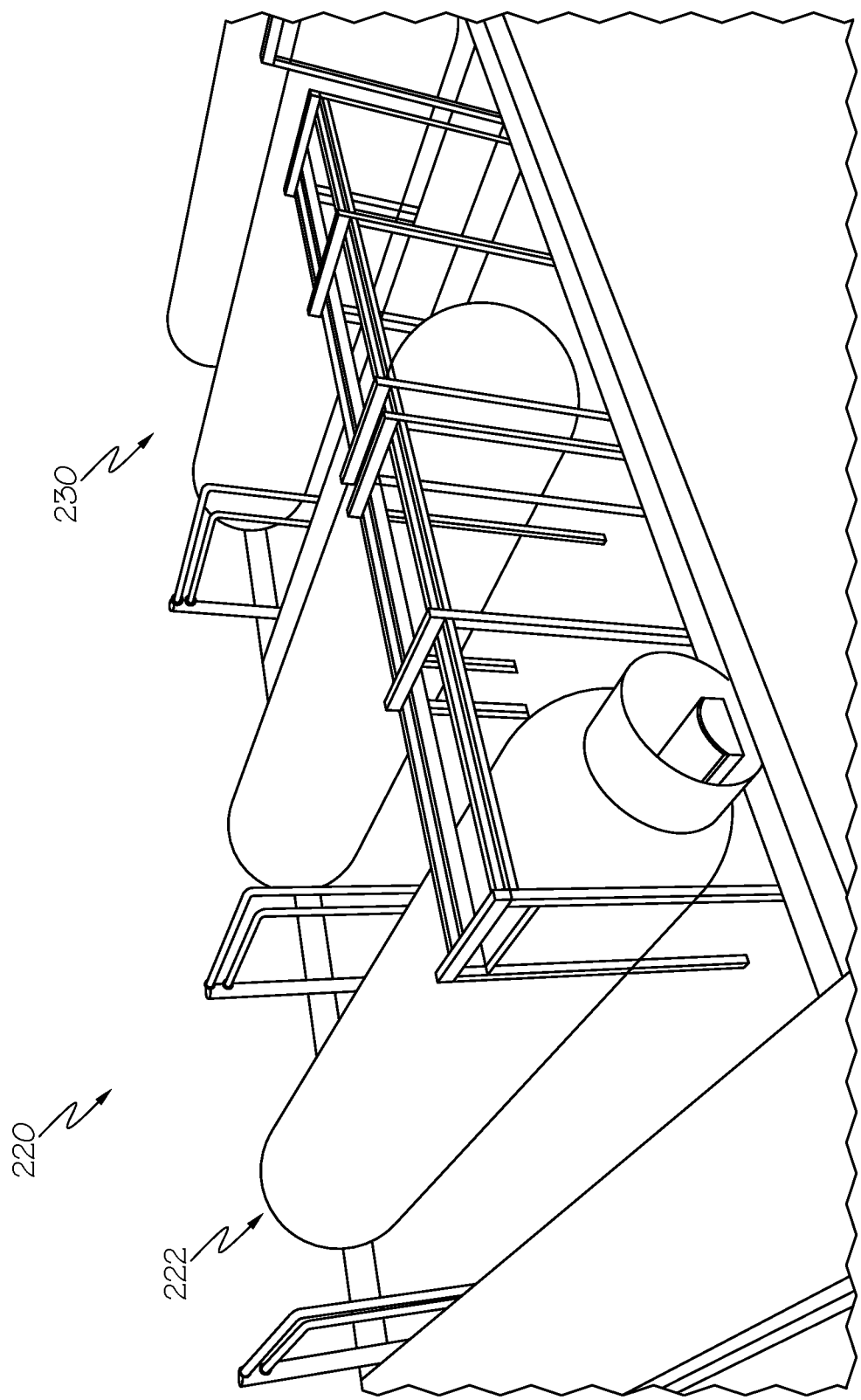
FIG. 4 is a perspective view of a portion of the system of FIG. 2.

Referring to FIG. 4, the curing, including heating 140, the first layup of composite material 715 in parallel together with the at least one additional first layup of composite material 717 occurs in an at least one autoclave 222 located in a first heating station 220. In one example, the heating 140 the first layup of composite material 715 occurs in one autoclave 222 and heating 140 the at least one additional first layup of composite material 717 occurs in a separate autoclave 222, both located within the first heating station 220.

The method 100 allows for multiple preforms to be processed at the same time, in parallel, in the autoclave 222 to increase through put of the curing process. In one example, the first plurality of composite panels 710 are stacked in a complementary configuration (such as nesting) within the autoclave 222 for parallel curing. The first layup of composite material 715 and the at least one additional first layup of composite material 717 may be arranged in a horizontal stacked arrangement for parallel heating. After heating 140, the first layup of composite material 715 and the at least one additional layup of composite material 717 are debagged prior to further fabrication.

Referring to FIG. 1, in one or more examples, the fabricating 120 the first plurality of composite panels 710 includes trimming 150 off manufacturing excess created during layup on the first plurality of composite panels 710 after heating 140. In one example, the trimming 150 occurs in a first trimming station 225, see FIG. 5, configured to trim the first plurality of composite panels 710. In one example, the trimming 150 takes approximately 5 minutes to approximately 25 minutes. In another example, the trimming 150 takes approximately 8 minutes to approximately 22 minutes. In another example, the trimming 150 takes approximately 10 minutes to approximately 20 minutes. In one example, the trimming 150 occurs at approximately 0.5" to approximately 1.5" per second. In another example, the trimming 150 occurs at approximately 1" per second.

Referring to FIG. 1, in one or more examples, the fabricating 120 the first plurality of composite panels comprises washing 160 the first plurality of composite panels 710 after heating 140. In one non-limiting example, the washing 160 comprises applying ultrasound energy to the first plurality of composite panels 710. The washing 160 occurs in a first washing station 230, see FIG. 2, configured to wash the first plurality of composite panels 710.

Referring to FIG. 1, in one or more examples, the fabricating 120 the first plurality of composite panels 710 comprises inspecting 165 the first plurality of composite panels 710. In one example, the inspecting 165 is performed concurrently with the washing 160 such that the first washing station 230 and the first inspection station 237 a part of a single unit, for example, a hybrid wash station. In another example, the inspecting 165 is performed consecutively with the washing 160 such that the first plurality of composite panels 710 are washed, transported out of the first washing station 230, then pass through the first inspection station 237. In one example, the first inspection station 237 is configured to perform nondestructive inspection (NDI). In another example, the first inspection station 237 is configured to perform inspecting 165 with automated robotic scanners and scanner heads.

Referring to FIG. 1, in one or more examples, the fabricating 120 the first plurality of composite panels 710 comprises painting 170 the first plurality of composite panels 710. In one example, the painting 170 occurs in a first painting station 240. In another example, the first painting station 240 is coupled with a first cure station 240a configured for curing 173 the first plurality of composite panels 710 after the painting 170.

Referring to FIG. 1, the method 100 comprises assembling 180 the first plurality of composite panels 710 to yield a first partial composite barrel section 712. In one example, the assembling 180 includes fastening the first plurality of composite panels 710 together to yield a first partial composite barrel section 712. The fastening the first plurality of composite panels 710 may be achieved with a butt splice and a splice plate. In another example, the assembling 180 comprises splicing the first plurality of composite panels 710. In another example, the assembling 180 includes using flex tracks 800 to join the first plurality of composite panels 710 into first partial barrel section 712. In yet another example, the assembling 180 includes using a mechanical fastener, an adhesive, or both to join the first plurality of composite panels 710 into first partial barrel section 712.

The first partial composite barrel section 712 may be approximately half of a full barrel structure 750, see FIG. 15. The assembling 180 the first plurality of composite panels 710 occurs in a first joining station 250 configured to join the first plurality of composite panels 710 to yield the first partial composite barrel section 712.

Referring to FIG. 1, in one or more examples, the method 100 includes fabricating 122 a second plurality of composite panels 720. The second plurality of composite panels 720 are assemblable into a second partial composite barrel section 722. In one example, the second partial composite barrel section 722 is approximately half of a full barrel structure 750, see FIG. 15 when joined longitudinally to a counterpart half barrel section. In another example, the second partial composite barrel section 722 is a lower half barrel section.

Still referring to FIG. 1, the fabricating 122 the second plurality of composite panels 720 occurs in a second workstation 300. In one example, the fabricating 122 the second plurality of composite panels 720 is automated such that a computer 900 is in communication with the second workstation 300. The computer may utilize one or more numerical control program 910 to direct fabrication and movement of the first plurality of composite panels 710 throughout the second workstation 300.

Still referring to FIG. 1, the fabricating 122 comprises assembling 132 a second layup of composite material 725. In one example, the assembling 132 a second layup of composite material 725 utilizes at least one layup machine 205 located in a second assembly station 310 for assembling a composite preform. The at least one layup machine 205 is configured to layup composite material 229 onto two or more second surfaces 209 such that there is a one-to-one relationship between each layup machine 205 and each of the two or more second surface 209.

In one example, the two or more second surfaces 209 include a tool 215 or mandrel 213. In another example, the at least one layup machine 205 is an automated fiber placement machine 205a in communication with the computer 900. In one example, each surface of the two or more second surfaces 209 is prepped for approximately 1 hour at 21 positions. Each surface or mandrel of the two or more second surfaces 209 is configured for assembling 132 a second layup of composite material 725 to yield one panel of the second plurality of composite panels 720. The assembling 132 may further include, after material layup of the second layup of composite material 725, bagging the second layup of composite material 725.

Referring to FIG. 1, the fabricating 122 the second plurality of composite panels 720 includes assembling 134 at least one additional second layup of composite material 727 concurrently with the assembling 132 the second layup of composite material 725. In one example, the assembling 134 at least one additional second layup of composite material 727 concurrently with the assembling 132 the second layup of composite material 725 utilizes at least one layup machine 205. The at least one layup machine 205 is configured to layup composite material 229 onto a tool 215 or mandrel 213. In one example, the at least one layup machine 205 is an automated fiber placement machine 205a in communication with the computer 900.

In another example, the fabricating 122 the second plurality of composite panels 720 includes assembling 134 at least two of the additional second layup of composite material 727 concurrently, in parallel with the assembling 132 the second layup of composite material 725. In one example, the assembling 134 at least two of the additional second layup of composite material 727 concurrently with the assembling 132 the second layup of composite material 725 utilizes at least one layup machine 205. The assembling 132 in parallel with the assembling 134 yields three preforms for further assembling 182 into a second partial barrel section 722. The at least one layup machine 205 is configured to layup composite material 229 onto a tool 215 or mandrel 213. In one example, the at least one layup machine 205 is an automated fiber placement machine 205a in communication with the computer 900.

Referring to FIG. 1, the fabricating 122 includes heating 142 the second layup of composite material 725 together with the at least one additional second layup of composite material 727. In one example, the heating 142 comprises applying pressure to the second layup of composite material 725 and the at least one additional second layup of composite material 727. In another example, the heating 142 comprises pneumatically applying pressure to the second layup of composite material 725 and the at least one additional second layup of composite material 727. In yet another example, the heating 142 comprises mechanically applying pressure to the second layup of composite material 725 and the at least one additional second layup of composite material 727. The heat and pressure would be compressive force during layup of the preform, often applied by roller after the composite material 229 is placed upon the mandrel 213 and/or the prior placed layer. Several means of applying the heat during the layup are contemplated including using heaters, infrared, or any other suitable means. After preform completion, the second layup of composite material 725 together with the at least one additional second layup of composite material 727 are bagged, in parallel, and inserted into the autoclave 222 for curing/heating 142 to form a composite fuselage panel structure ready for further processing including trimming, washing, inspecting and painting.

In one example, the curing including heating 142 the second layup of composite material 725 together with the at least one additional second layup of composite material 727 occurs in an at least one autoclave 222 located in a second heating station 320. In one example, the heating 142 the second layup of composite material 725 occurs in one autoclave 222 and heating 142 the at least one additional second layup of composite material 727 occurs in a separate autoclave 222, both located within the second heating station 320. Heating 142 multiple preforms in parallel saves time and increases throughput of the curing process. The stacking of the second layup of composite material 725 together with the at least one additional second layup of composite material 727 includes any suitable arrangement including, for example, a complementary configuration such as nesting within the autoclave 222. The second layup of composite material 725 and the at least one additional second layup of composite material 727 may be arranged in a horizontal stacked arrangement for parallel heating 142. After heating 142, the second layup of composite material 725 and the at least one additional second layup of composite material 727 are debagged prior to further fabrication.

Referring to FIG. 1, in one or more examples, the fabricating 122 comprises trimming 152 off manufacturing excess creating during layup of the second plurality of composite panels 720 after heating 142. In one example, the trimming 152 occurs in a second trimming station 325, see FIG. 2, configured to trim the second plurality of composite panels 720. In one example, the trimming 152 takes approximately 5 minutes to approximately 25 minutes. In another example, the trimming 152 takes approximately 8 minutes to approximately 22 minutes. In yet another example, the trimming 152 takes approximately 10 minutes to approximately 20 minutes. In one example, the trimming 152 occurs at approximately 0.5" to approximately 1.5" per second. In another example, the trimming 152 occurs at approximately 1" per second.

Referring to FIG. 1, in one or more examples, the fabricating 122 includes washing 162 the second plurality of composite panels 720 after heating 142. In one example, the washing 162 includes applying ultrasound energy to the second plurality of composite panels 720. The washing 162 occurs in a second washing station 330, see FIG. 2, configured to wash the second plurality of composite panels 720.

Referring to FIG. 1, in one or more examples, the fabricating 122 the second plurality of composite panels 720 comprises inspecting 167 the second plurality of composite panels 720. In one example, the inspecting 167 is performed concurrently with the washing 162 such that the second washing station 330 and the second inspection station 337 a part of a single unit, for example, a hybrid wash station. In another example, the inspecting 167 is performed consecutively with the washing 162 such the second plurality of composite panels 720 are washed, transported out of the second washing station 330, then pass through the second inspection station 337. In one example, the second inspection station 337 is configured to perform nondestructive inspection (NDI). In another example, the second inspection station 337 is configured to perform inspecting 167 with automated robotic scanners and scanner heads.

Referring to FIG. 1, in one or more examples, the fabricating 122 the second plurality of composite panels 720 comprises painting 172 the second plurality of composite panels 720. In one example, the painting 172 occurs in a second painting station 340, see FIG. 2. In another example, the second painting station 340 is coupled with a second cure station 340a configured for curing 174 the second plurality of composite panels 720 after the painting 172.

Referring to FIG. 1, in one or more examples, the fabricating 122 the second plurality of composite panels 720 comprises assembling 182 the second plurality of composite panels 720 to yield a second partial composite barrel section 722. The second partial barrel structure 722 may be half of a full barrel structure 750. In one example, the assembling 182 includes fastening the second plurality of composite panels 720 together to yield a second partial composite barrel section 722. The fastening the second plurality of composite panels 720 may be achieved with a butt splice and a splice plate. In another example, the assembling 182 the second plurality of composite panels 720 comprises splicing the second plurality of composite panels 720 with flex tracks 800. In another example, the assembling 182 the second plurality of composite panels 720 comprises splicing the second plurality of composite panels 720 with a mechanical fastener, an adhesive, or both.

Referring to FIG. 1, in one or more examples, the method 100 comprises assembling 190 the first partial composite barrel section 712 and the second partial composite barrel section 722 to yield the composite barrel structure 700. In one example, the composite barrel structure 700 is a full barrel structure 750. In one example, the assembling 190 the first partial composite barrel section 712 and the second partial composite barrel section 722 comprises splicing the first partial composite barrel section 712 and the second partial composite barrel section 722 with flex tracks 800. In another example, the assembling 190 the first partial composite barrel section 712 and the second partial composite barrel section 722 comprises splicing the first partial composite barrel section 712 and the second partial composite barrel section 722 with a mechanical fastener, an adhesive, or both.

FIG. 2 illustrates a system 600 for fabricating a plurality of panels that are assemblable into partial barrel sections. The system 600 includes a plurality of stations configured to perform the method 100 as shown and described herein. The plurality of stations are configured to communicate and work together via a computer 900 and at least one numerical control program 910. The movement of the plurality of panels throughout the system 600 is automated. In one example, the plurality of panels move throughout the system 600 via a transport system 610.

Referring to FIG. 2, the system 600 for fabricating a plurality of panels that are assemblable into partial barrel sections comprises a first workstation 200. First workstation 200 is configured for fabricating a first plurality of composite panels 710 that are assemblable into a first partial composite barrel section 712. First workstation 200 includes more than one substation (for example, 210, 220, 225, etc.) to facilitate assembly of the first plurality of composite panels 710.

Referring to FIG. 2 and FIG. 3, the first workstation 200 comprises a first assembly station 210 configured to concurrently assemble a first layup of composite material 715 and at least one additional layup of the composite material 717. In one example, the first assembly station 210 is configured to concurrently assemble a first layup of composite material 715 and at least two of the additional layup of the composite material 717. The first assembly station 210 may further be configured to bag the first layup of composite material 715 and at least two of the additional layup of composite material 717.

Referring to FIG. 3 and FIG. 4, the first workstation 200 comprises a first heating station 220 configured to heat the first layup of composite material 715 concurrently with the at least one additional layup of composite material 717 to yield the first plurality of composite panels 710. In one example, the first heating station 220 is configured to heat the first layup of composite material 715 concurrently with at least two of the additional layup of composite material 717 to yield the first plurality of composite panels 710. In one or more examples, the first heating station 220 comprises at least one autoclave 222. In another example, the first heating station 220 comprises two or more of autoclave 222. In one example, the first heating station 220 comprises a mechanical press 231. In one example, the first heating station 220 is configured to apply pressure and heat to yield the first plurality of composite panels 710 as part of the cure cycle. The pressure applied may be pneumatic or mechanical. The pressure applied may further be consolidating pressure.

Figure 5:
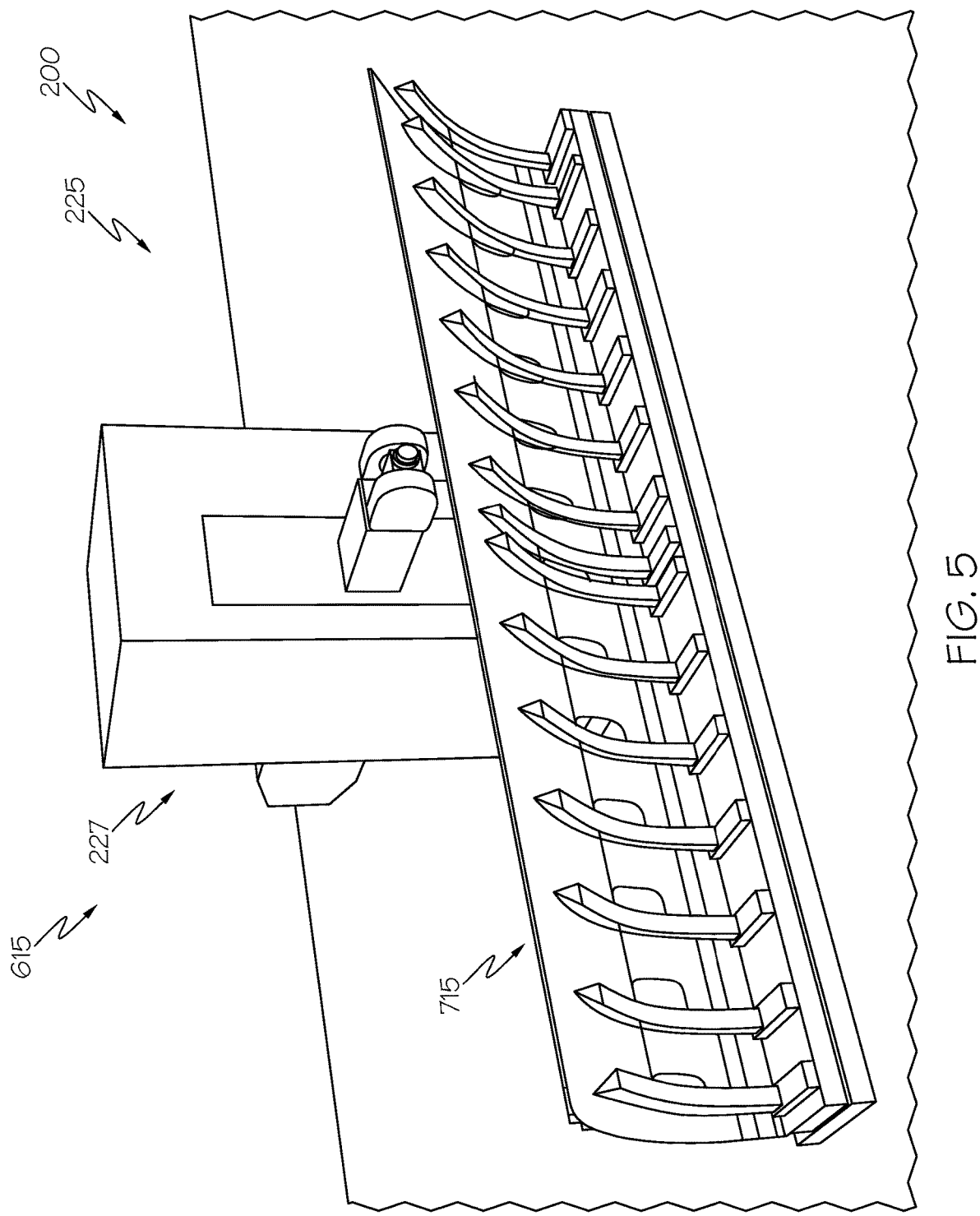
FIG. 5 is a perspective view of a portion of the system of FIG. 2.

Referring to FIG. 5, the first workstation 200 includes a first trimming station 225 configured to trim the first plurality of composite panels 710. The first trimming station 225 may be further configured to drill assembly holes into the first plurality of composite panels 710 in conjunction with trimming to facilitate further fabrication. The first plurality of panels 710 are supported in at least one holding fixture 615 in the trimming station 225. In one example, the holding fixture 615 is a panel holding fixture 227.

Figure 6:
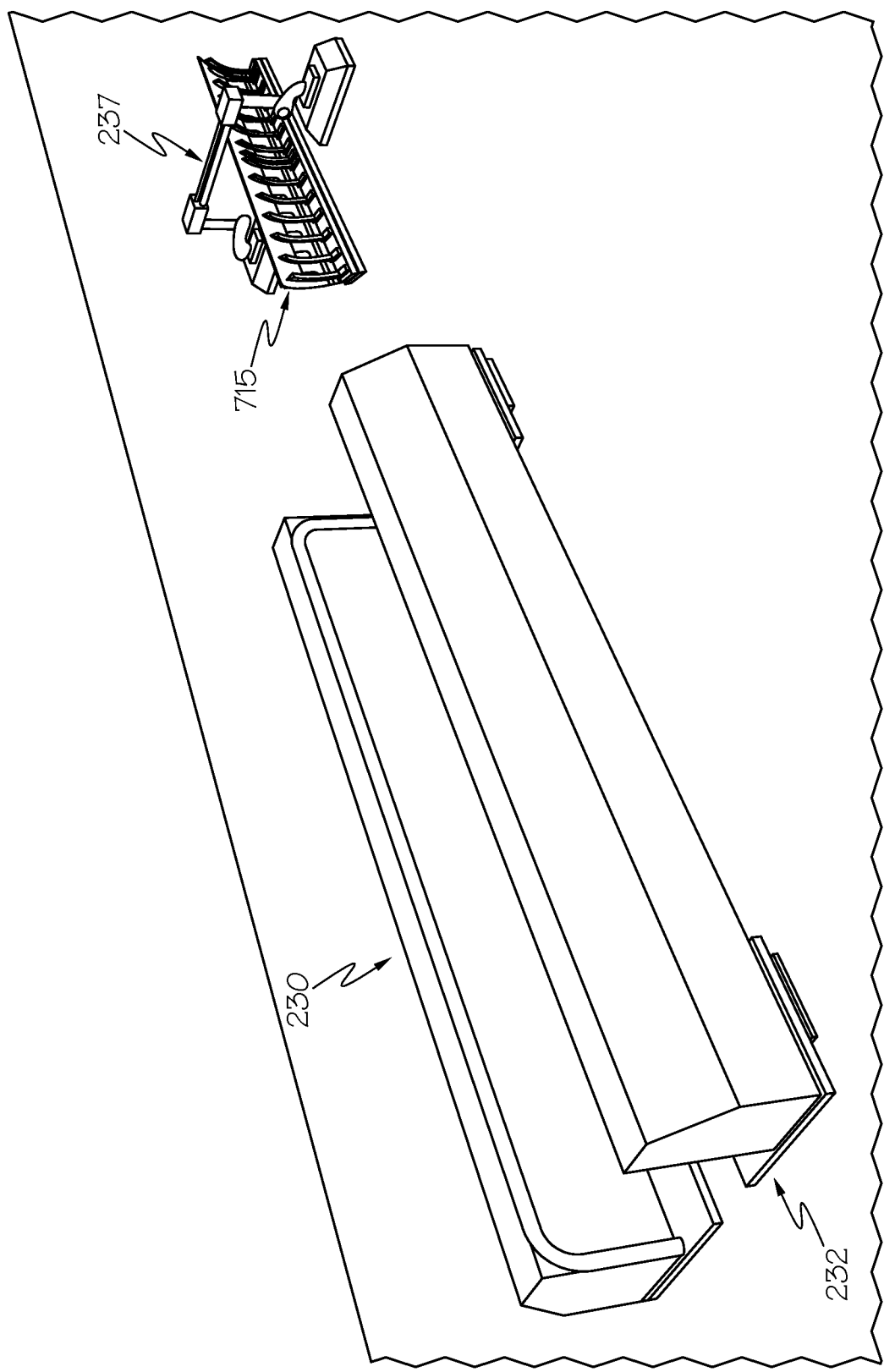
FIG. 6 is a perspective view of a portion of the system of FIG. 2.

Referring to FIG. 6, the first workstation 200 includes a first washing station 230 configured to wash the first plurality of composite panels 710. In one example, the first washing station 230 comprises wash elements. In another example, the first washing station 230 includes spray wash elements. The first washing station 230 may include a clamshell type enclosure 232 to contain the first plurality of composite panels 710.

Still referring to FIG. 6, the first workstation 200 includes a first inspection station 237 configured to inspect the first plurality of composite panels 710. The first inspection station 237 may perform NDI and include automated robotic scanners and scanner heads. The NDI may be performed in at least 7 positions for each panel of the first plurality of composite panels 710. In one example, the first inspection station 237 is coupled with the first washing station 230 such that the first plurality of composite panels 710 may be inspected and washed concurrently or consecutively.

Figure 7:
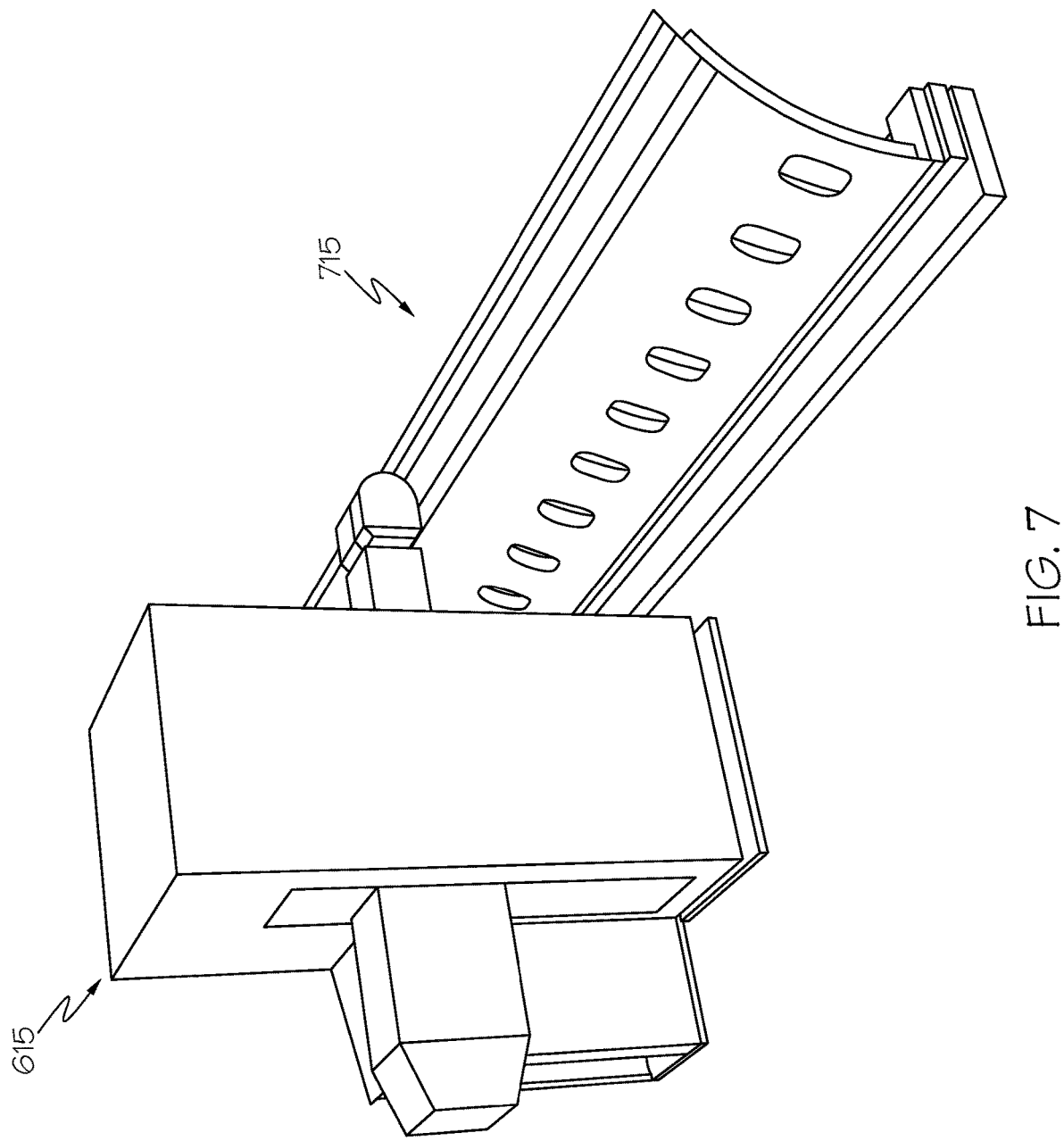
FIG. 7 is a perspective view of a portion of the system of FIG. 2.

Referring to FIG. 7, the first workstation 200 includes as least one includes holding fixture 615 for handling and transportation of the first layup of composite material 715 of the first plurality of composite panels 710. The holding fixture 615 is configured to move laterally and vertically as well as facilitate rotation of the first plurality of composite panels 710.

Figure 8:
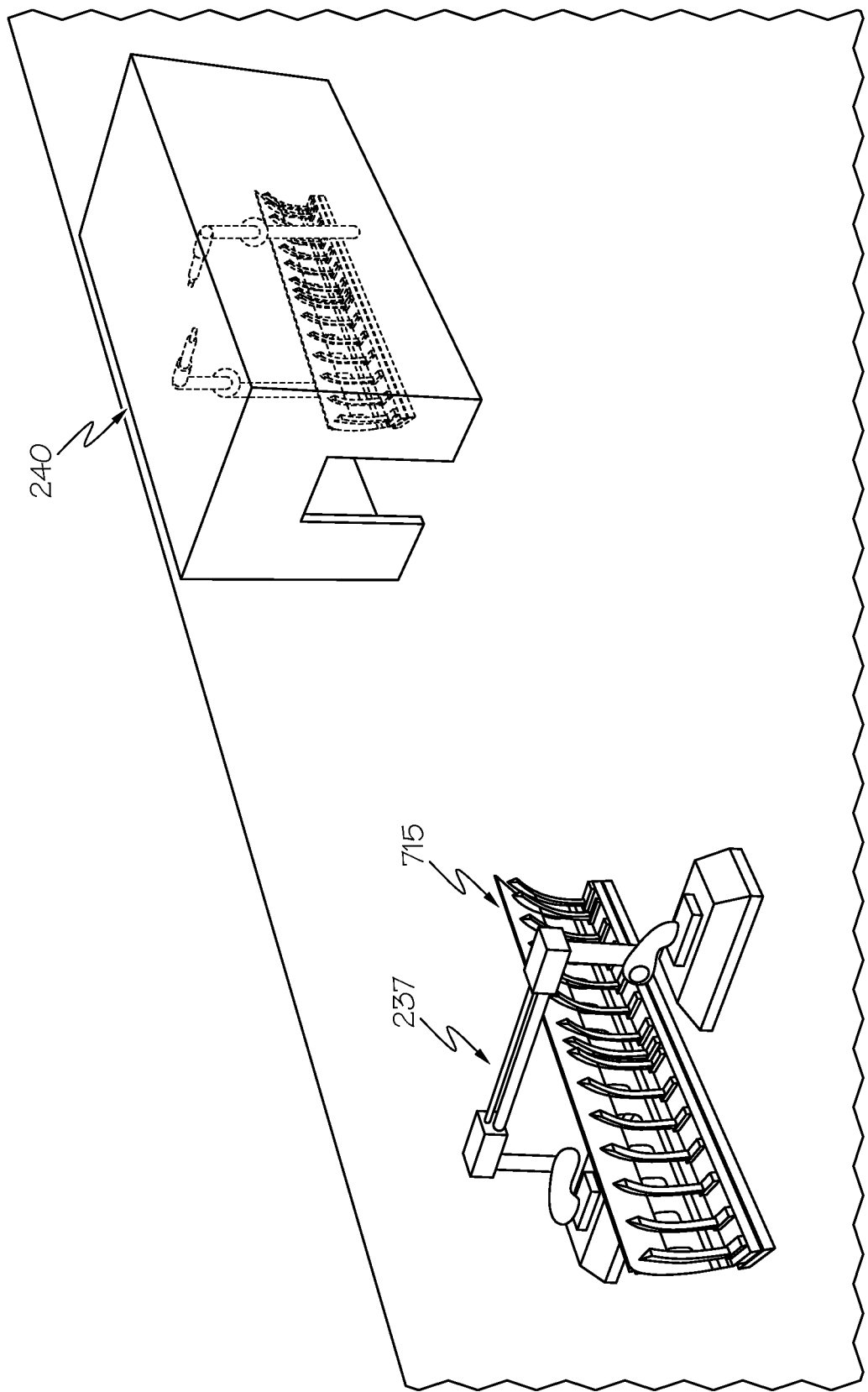
FIG. 8 is a perspective view of a portion of the system of FIG. 2.
Figure 9:
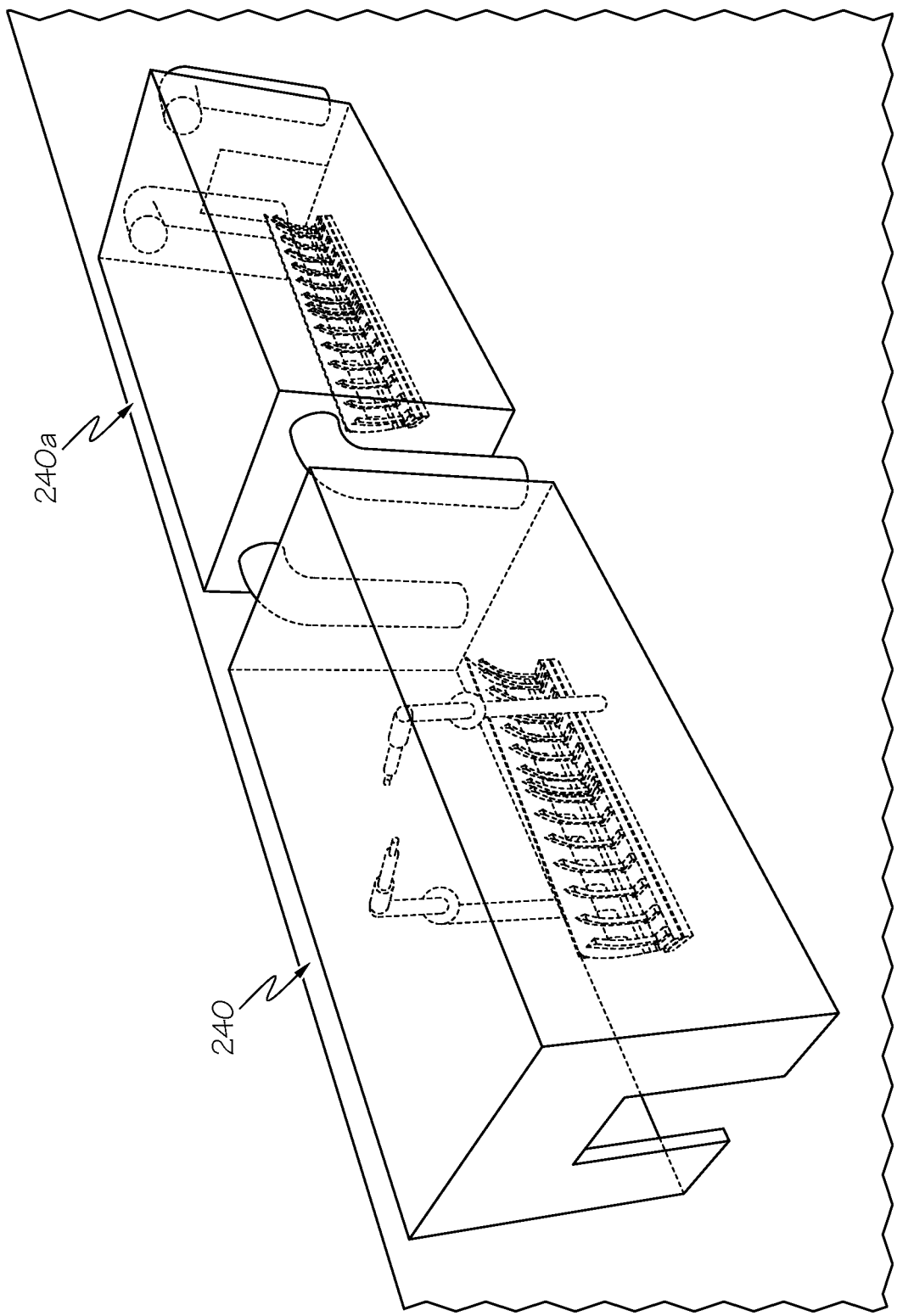
FIG. 9 is a perspective view of a portion of the system of FIG. 2.

Referring to FIG. 8, the first workstation 200 comprises a first painting station 240 configured to paint the first plurality of composite panels 710. In one example, the first painting station 240 includes paint robots configured to laydown coating at approximately 20 sq. ft. per minute. The first painting station 240 may be coupled with a first cure station 240a, see FIG. 9, configured to cure the first plurality of composite panels 710 after painting. In one example, the first cure station 240a is an enclosed and heated such that it is configured to accelerate paint cure to approximately 1 hour. The temperature in the first cure station 240a is approximately 100° F. to approximately 120° F.

Referring to FIG. 2, the first workstation 200 includes a first panel drill station 245. In one example, the first panel drill station 245 is configured to trim and drill the first plurality of composite panels 710. The first panel drill station 245 is configured to drill holes necessary for further assembly of the first plurality of composite panels 710. The first panel drill station 245 is further configured to digitize and predictively perform assembly order of operations. In one example, the digitization includes predictively performing splice straps for a horizontal splice of the first plurality of composite panels 710. Further, the first panel drill station 245 is configured to predrill longitudinal splices such that they only require fastener installation downstream.

Figure 10:
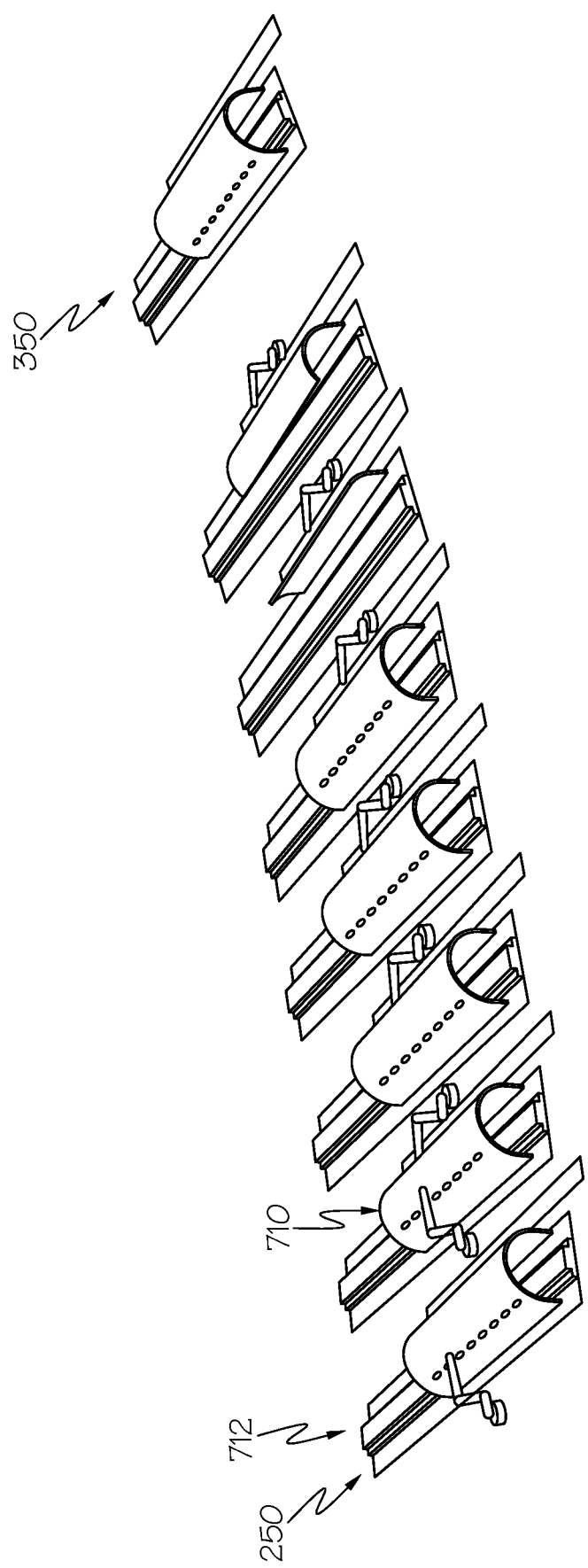
FIG. 10 is a perspective view of a portion of the system of FIG. 2.

Referring to FIG. 2 and FIG. 10, the first workstation 200 comprises a first joining station 250 configured to join the first plurality of composite panels 710 to yield the first partial composite barrel section 712. In one example, the first joining station 250 utilizes flex tracks 800 to splice the first plurality of composite panels 710.

In one example, ⅓ panels are longitudinally joined with butt splices that in some embodiments are joined with flex track fastener drilling and installing devices that move on tracks placed upon the panels themselves after the panels are located relative to each other, tacked into place and then the flex track drill and fastener install progresses down the splice to splice the splice plate to each of the ⅓ skin panels it is bridgingly joined. Further, at the first joining station 250, much of the interior structure is added to the joined structure, such as frame installation, ceiling components, windows and doors in upper half barrel section and floor components and/or doors in the lower half barrel section. The open down position of the half barrel sections allow easy worker/robot access to the interior the half barrel section from the shop floor. This is more efficient as the structure is brought to where the tools and workers are positioned. Current assembly processes where a full barrel section is assembled and then frames and other interior structure is added requires all workers, tools and materials to be brought into the barrel and set up each time relative to the structure. This is very inefficient as it is being built up and torn down on a regular basis. This process adds a lot of non-value added time to the process. When the lower half barrel section is at the point where it should be advanced to the next work station, then the lower half barrel section progresses to the FIG. 11 device where it is inverted into an open up position from the open down position. Then the open up lower half barrel section is ready to be longitudinally joined to the open down upper half barrel section.

Figure 11:
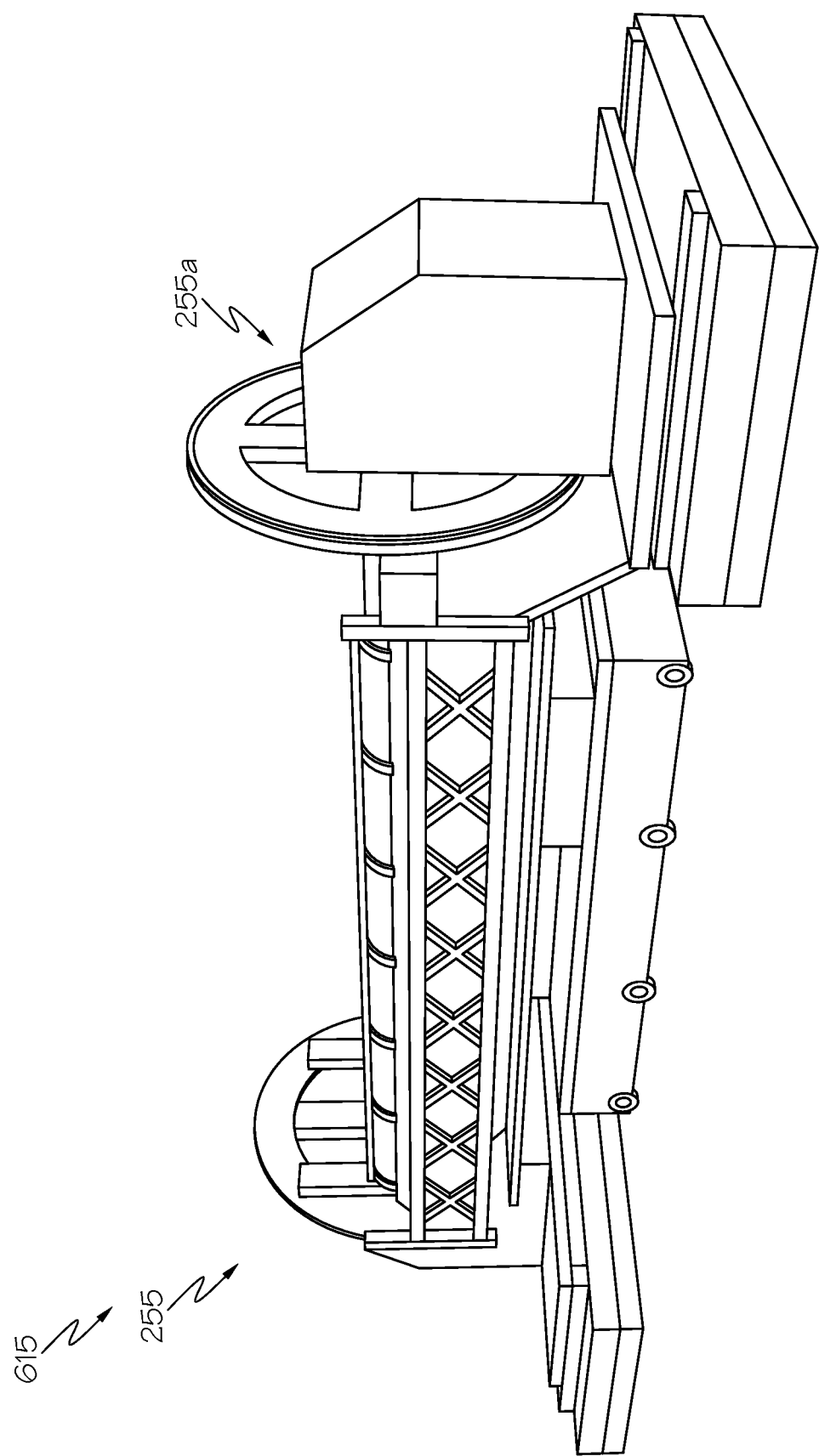
FIG. 11 is a perspective view of a portion of the system of FIG. 2.
Figure 12:
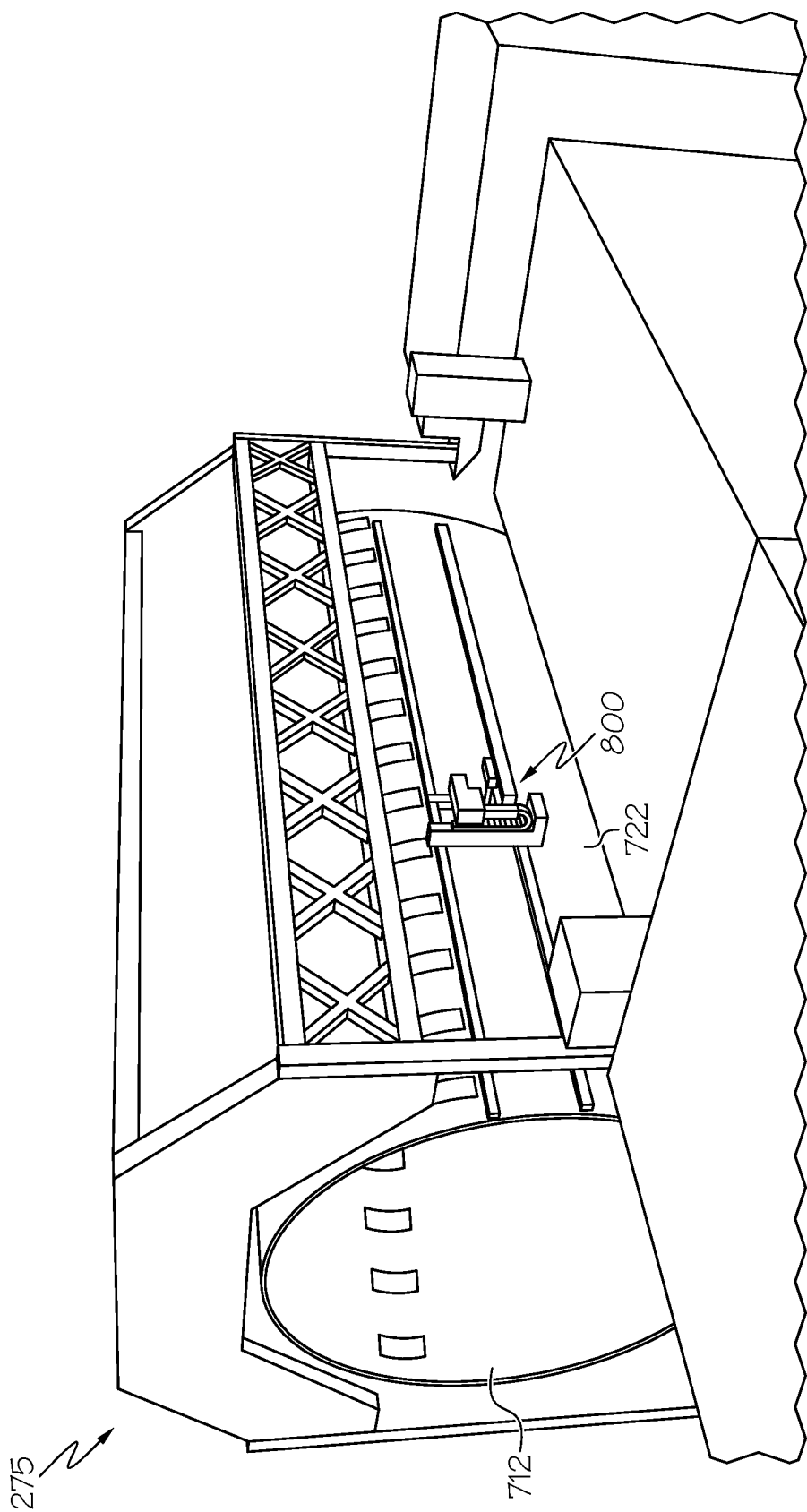
FIG. 12 is a perspective view of a portion of the system of FIG. 2.

Referring to FIG. 2 and FIG. 11, the first workstation 200 comprises a first rotation station 255. The first rotation station 255 includes a holding fixture 615 for handling and transportation of the first partial composite barrel section 712. In one example, the holding fixture 615 is rotating fixture 255a configured to rotate the first partial composite barrel section 712 for further processing and assembly.

Referring to FIG. 2, in one or more examples, the system 600 comprises a second workstation 300 for fabricating a second plurality of composite panels 720 that are assemblable into a second partial composite barrel section 722.

Referring to FIG. 2, in one or more examples, the second workstation 300 comprises a second assembly station 310 configured to concurrently, in parallel assemble a second layup of composite material 725 and at least one additional second layup of the composite material 727. In one example, the second assembly station 310 is configured to concurrently assemble a second layup of composite material 725 and at least two of the additional second layup of the composite material 727. The second assembly station 310 may further be configured to bag the second layup of composite material 725 and at least two of the additional second layup of composite material 727.

The second assembly station 310 includes at least one layup machine 205 is configured to layup composite material 229 onto two or more second surfaces 209 in parallel. In one example, the two or more second surfaces 209 include a tool 215 or mandrel 213. In another example, the at least one layup machine 205 is an automated fiber placement machine 205a in communication with the computer 900 such that a one-to-one relationship exists between each at least one layup machine 205 and each of the two or more second surface 209. For example, three of the two or more second surfaces 209 may be paired with three of the at least one layup machine 205 to assemble, in parallel, three preforms for further assembly into a second partial composite barrel section 722.

In one example, each surface of the two or more second surfaces 209 is prepped for approximately 1 hour at 21 positions 217. Each first surface 207 or mandrel of the two or more second surfaces 209 is configured for assembling a second layup of composite material 725 to yield one panel of the second plurality of composite panels 720.

Referring to FIG. 2, in one or more examples, the second workstation 300 comprises a second heating station 320 configured to heat the second layup concurrently with the at least one additional layup to yield the second plurality of composite panels 720 as part of the cure cycle. In one example, the second heating station 320 is configured to apply heat and pressure to the second plurality of composite panels 720. In one example, the second heating station 320 comprises an autoclave. In another example, the second heating station comprises a mechanical press 231.

Referring to FIG. 2, in one or more examples, the second workstation 320 comprises a second trimming station 325 configured to trim the second plurality of composite panels 720. The second trimming station 325 may be further configured to drill assembly holes into the second plurality of composite panels 720 in conjunction with trimming to facilitate further fabrication.

Referring to FIG. 2, in one or more examples, the second workstation 300 comprises a second washing station 330 configured to wash the second plurality of composite panels 720. In one non-limiting example, the second washing station 330 comprises ultrasonic wash elements. In another example, the second washing station 330 comprises spray wash elements. The second washing station 330 includes a clamshell type enclosure 232 to contain the second plurality of composite panels 720.

Referring to FIG. 2, in one or more examples, the second workstation 300 comprises a second painting station 340 configured to paint the second plurality of composite panels 720. In one example, the second painting station 340 includes paint robots configured to laydown coating at approximately 20 sq. ft. per minute. The second painting station 340 may be coupled with a second cure station 340a configured to cure the second plurality of composite panels 720 after painting. In one example, the second cure station 340a is an enclosed and heated such that it is configured to accelerate paint cure to approximately 1 hour. The temperature in the second cure station 340a is approximately 100° F. to approximately 120° F.

Referring to FIG. 2, the second workstation 300 includes a second panel drill station 345. In one example, the second panel drill station 345 is configured to trim and drill the second plurality of composite panels 720. The second panel drill station 345 is configured to drill holes necessary for further assembly of the second plurality of composite panels 720. The second panel drill station 345 is further configured to digitize and predictively perform assembly order of operations. In one example, the digitization includes predictively performing splice straps for a horizontal splice of the second plurality of composite panels 720. Further, the second panel drill station 345 is configured to predrill longitudinal splices such that they only require fastener installation downstream.

Referring to FIG. 2, in one or more examples, the second workstation 300 comprises a second joining station 350 configured to join the second plurality of composite panels 720 to yield the second partial composite barrel section 722. In one example, the second joining station 350 utilizes flex tracks 800 to splice the second plurality of composite panels 720. In another example, the second joining station 350 utilizes at least one of a mechanical faster or adhesive to join the second plurality of composite panels 720 to yield the second partial composite barrel section 722.

As shown in FIG. 2, the second workstation 300 comprises a second rotation station 355. The second rotation station 355 includes a holding fixture 615 for handling and transportation the second partial composite barrel section 722. In one example, the holding fixture 615 is rotating fixture 255a configured to rotate the second partial composite barrel section 722 for further processing and assembly.

Referring to FIG. 2, in one or more examples, the system 600 comprises a full joining station 275 configured to join the first partial barrel section 712 and the second partial barrel section 722 to yield a full barrel structure 750. In one example, the full barrel structure 750 is an airplane component. In one example, the full barrel structure 750 comprises six panels or six layups of composite material. The full joining station 275 utilizes one or more mechanical fastener or adhesive to join the first partial barrel section 712 and the second partial barrel section 722. In one example, the mechanical fastener includes flex tracks 800.

Referring to FIG. 2, the system 600 for fabricating a plurality of panels that are assemblable into partial barrel sections comprises a third workstation 400. Third workstation 400 is configured for fabricating a first plurality of composite panels 710 that are assemblable into a first partial composite barrel section 712. Third workstation 400 includes more than one substation to facilitate assembly of the first plurality of composite panels 710.

Referring to FIG. 2, the third workstation 400 comprises a third assembly station 410 configured to concurrently assemble a third layup of composite material 715 and at least one additional layup of the composite material 717. In one example, the third assembly station 410 is configured to concurrently assemble a third layup of composite material 715 and at least two of the additional layup of the composite material 717. The third assembly station 410 may further be configured to bag the first layup of composite material 715 and at least two of the additional layup of composite material 717.

Referring to FIG. 2, the third workstation 400 comprises a third heating station 420 configured to heat the third layup of composite material 715 concurrently with the at least one additional layup of composite material 717 to yield the first plurality of composite panels 710. In one example, the third heating station 420 is configured to heat the third layup of composite material 715 concurrently with at least two of the additional layup of composite material 717 to yield the first plurality of composite panels 710. In one or more examples, the third heating station 420 comprises at least one autoclave 222. In another example, the third heating station 420 comprises two or more of autoclave 222. In one example, the third heating station 420 comprises a mechanical press 231. In one example, the third heating station 420 is configured to apply pressure and heat to yield the first plurality of composite panels 710. The pressure applied may be pneumatic or mechanical. The pressure applied may further be consolidating pressure.

Referring to FIG. 2, the third workstation 400 includes a third trimming station 425 configured to trim the first plurality of composite panels 710. The third trimming station 425 may be further configured to drill the first plurality of composite panels 710 in conjunction with trimming to facilitate further fabrication.

Referring to FIG. 2, the third workstation 400 includes a third washing station 430 configured to wash the first plurality of composite panels 710. In one example, the third washing station 430 comprises ultrasonic wash elements. In another example, the third washing station 430 includes spray wash elements. The third washing station 430 may include a clamshell type enclosure 232 to contain the first plurality of composite panels 710.

Still referring to FIG. 2, the third workstation 400 includes a third inspection station 437 configured to inspect the first plurality of composite panels 710. The third inspection station 437 may perform NDI and include automated robotic scanners and scanner heads. In one example, the third inspection station 437 is coupled with the third washing station 430 such that the first plurality of composite panels 710 may be inspected and washed concurrently or consecutively.

Illustrated in FIG. 2, the third workstation 400 comprises a third painting station 440 configured to paint the first plurality of composite panels 710. In one example, the third painting station 440 includes paint robots configured to laydown coating at approximately 20 sq. ft. per minute. The third painting station 440 may be coupled with a third cure station 440a configured to cure the first plurality of composite panels 710 after painting. In one example, the third cure station 440a is an enclosed and heated such that it is configured to accelerate paint cure to approximately 1 hour. The temperature in the third cure station 440a is approximately 100° F. to approximately 120° F.

Referring to FIG. 2, the third workstation 400 includes a third panel drill station 245. In one example, the third panel drill station 445 is configured to trim and drill the first plurality of composite panels 710. The third panel drill station 445 is configured to drill holes necessary for further assembly of the first plurality of composite panels 710. The third panel drill station 445 is further configured to digitize and predictively perform assembly order of operations. In one example, the digitization includes predictively performing splice straps for a horizontal splice of the first plurality of composite panels 710. Further, the third panel drill station 445 is configured to predrill longitudinal splices such that they only require fastener installation downstream.

Still referring to FIG. 2, the third workstation 400 comprises a third joining station 450 configured to join the first plurality of composite panels 710 to yield the first partial composite barrel section 712. In one example, the third joining station 450 utilizes flex tracks 800 to splice the first plurality of composite panels 710.

As shown in FIG. 2, the third workstation 400 comprises a third rotation station 455. The third rotation station 455 includes a holding fixture 615 for handling and transportation the first partial composite barrel section 712. In one example, the holding fixture 615 is rotating fixture 255a configured to rotate the first partial composite barrel section 712 for further processing and assembly.

Referring to FIG. 2, the system 600 for fabricating a plurality of panels that are assemblable into partial barrel sections comprises a fourth workstation 500. Fourth workstation 500 is configured for fabricating a second plurality of composite panels 720 that are assemblable into a second partial composite barrel section 722. Fourth workstation 500 includes more than one substation to facilitate assembly of the second plurality of composite panels 720.

Referring to FIG. 2, the fourth workstation 500 comprises a fourth assembly station 510 configured to concurrently assemble a fourth layup of composite material 715 and at least one additional layup of the composite material 717. In one example, the fourth assembly station 510 is configured to concurrently assemble a fourth layup of composite material 715 and at least two of the additional layup of the composite material 717. The fourth assembly station 510 may further be configured to bag the second layup of composite material 725 and at least two of the additional second layup of composite material 727.

Referring to FIG. 2, the fourth workstation 500 comprises a fourth heating station 520 configured to heat the fourth layup of composite material 715 concurrently with the at least one additional layup of composite material 717 to yield the second plurality of composite panels 720. In one example, the fourth heating station 520 is configured to heat the fourth layup of composite material 715 concurrently with at least two of the additional layup of composite material 717 to yield the second plurality of composite panels 720. In one or more examples, the fourth heating station 520 comprises at least one autoclave 222. In another example, the fourth heating station 520 comprises two or more of autoclave 222. In one example, the fourth heating station 520 comprises a mechanical press 231. In one example, the fourth heating station 520 is configured to apply pressure and heat to yield the second plurality of composite panels 720. The pressure applied may be pneumatic or mechanical. The pressure applied may further be consolidating pressure.

Referring to FIG. 2, the fourth workstation 500 includes a fourth trimming station 525 configured to trim the second plurality of composite panels 720.

Referring to FIG. 2, the fourth workstation 500 includes a fourth washing station 530 configured to wash the second plurality of composite panels 720. In one example, the fourth washing station 530 comprises ultrasonic wash elements. In another example, the fourth washing station 530 comprises spray wash elements. In another example, the fourth washing station 530 includes spray wash elements. The fourth washing station 530 may include a clamshell type enclosure 232 to contain the second plurality of composite panels 720.

Still referring to FIG. 2, the fourth workstation 500 includes a fourth inspection station 537 configured to inspect the second plurality of composite panels 720. The fourth inspection station 537 may perform NDI and include automated robotic scanners and scanner heads. In one example, the fourth inspection station 537 is coupled with the fourth washing station 530 such that the second plurality of composite panels 720 may be inspected and washed concurrently or consecutively.

Illustrated in FIG. 2, the fourth workstation 500 comprises a fourth painting station 540 configured to paint the second plurality of composite panels 720. In one example, the fourth painting station 540 includes paint robots configured to laydown coating at approximately 20 sq. ft. per minute. The fourth painting station 540 may be coupled with a fourth cure station 540a configured to cure the second plurality of composite panels 720 after painting. In one example, the fourth cure station 540a is an enclosed and heated such that it is configured to accelerate paint cure to approximately 1 hour. The temperature in the fourth cure station 540a is approximately 100° F. to approximately 120° F.

Referring to FIG. 2, the fourth workstation 500 includes a fourth panel drill station 245. In one example, the fourth panel drill station 545 is configured to trim and drill the second plurality of composite panels 720. The fourth panel drill station 545 is configured to drill holes necessary for further assembly of the second plurality of composite panels 720. The fourth panel drill station 545 is further configured to digitize and predictively perform assembly order of operations. In one example, the digitization includes predictively performing splice straps for a horizontal splice of the second plurality of composite panels 720. Further, the fourth panel drill station 545 is configured to predrill longitudinal splices such that they only require fastener installation downstream.

Still referring to FIG. 2, the fourth workstation 500 comprises a fourth joining station 550 configured to join the second plurality of composite panels 720 to yield the second partial composite barrel section 722. In one example, the fourth joining station 550 utilizes flex tracks 800 to splice the second plurality of composite panels 720.

The disclosed system 600 allows production rates to increase, and even double what is possible through use of parallel processing.

Examples of the subject matter disclosed herein may be described in the context of aircraft manufacturing and service method and aircraft. During pre-production, illustrative method may include specification and design of aircraft and material procurement. During production, component and subassembly manufacturing and system integration of aircraft may take place. Thereafter, aircraft may go through certification and delivery to be placed in service. While in service, aircraft may be scheduled for routine maintenance and service. Routine maintenance and service may include modification, reconfiguration, refurbishment, etc. of one or more systems of aircraft.

Each of the processes of illustrative method may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Aircraft produced by illustrative method may include airframe with a plurality of high-level systems and interior. Examples of high-level systems include one or more of propulsion system, electrical system, hydraulic system, and environmental system. Any number of other systems may be included. Although an aerospace example is shown, the principles disclosed herein may be applied to other industries, such as the automotive industry. Accordingly, in addition to aircraft, the principles disclosed herein may apply to other vehicles, e.g., land vehicles, marine vehicles, space vehicles, etc.

Apparatus(es) and method(s) shown or described herein may be employed during any one or more of the stages of the manufacturing and service method. For example, components or subassemblies corresponding to component and subassembly manufacturing may be fabricated or manufactured in a manner similar to components or subassemblies produced while aircraft is in service. Also, one or more examples of the apparatus(es), method(s), or combination thereof may be utilized during production stages, for example, by substantially expediting assembly of or reducing the cost of aircraft. Similarly, one or more examples of the apparatus or method realizations, or a combination thereof, may be utilized, for example and without limitation, while aircraft is in service and/or during maintenance and service.

Also disclosed is the ornamental design for an aircraft fuselage as shown in FIGS. 16-29. Broken lines in the FIGS. 16-29 show environment that forms no part of the claimed design.

Different examples of the apparatus(es) and method (s) disclosed herein include a variety of components, features, and functionalities. It should be understood that the various examples of the apparatus(es) and method (s), disclosed herein, may include any of the components, features, and functionalities of any of the other examples of the apparatus(es) and method (s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. A method for manufacturing a composite barrel structure, the method comprising:
    fabricating a first plurality of composite panels that are assemblable into a first partial composite barrel section, the fabricating the first plurality of composite panels comprising:
        assembling a first layup of composite material;
        concurrently with the assembling the first layup of composite material, assembling at least one additional layup of composite material; and
        heating the first layup of composite material together with the at least one additional layup of composite material,
        wherein the assembling the first layup, the assembling the at least one additional layup, and the heating are performed at a first workstation;
    concurrently with the fabricating the first plurality of composite panels, fabricating a second plurality of composite panels that are assemblable into a second partial composite barrel section at a second workstation; and
    assembling the first partial composite barrel section and the second partial composite barrel section at a full joining station to yield the composite barrel structure.

2. The method of claim 1, wherein the fabricating the first plurality of composite panels comprises:
    concurrently with the assembling the first layup of composite material, assembling at least two of the additional layup of composite material.

3. The method of claim 1, wherein the assembling the first layup of composite material comprises:
    laying up composite material on two or more first surfaces.

4. The method of claim 1, wherein the heating comprises:
    applying pressure to the first layup of composite material and the at least one additional layup of composite material.

5. The method of claim 1, wherein the fabricating the first plurality of composite panels comprises:
    trimming the first plurality of composite panels after heating.

6. The method of claim 1, wherein the fabricating the first plurality of composite panels comprises:
    washing the first plurality of composite panels after heating.

7. The method of claim 1, wherein the fabricating the first plurality of composite panels comprises:
   painting the first plurality of composite panels.

8. The method of claim 1 further comprising:
   assembling the first plurality of composite panels to yield the first partial composite barrel section.

9. The method of claim 8, wherein the assembling the first plurality of composite panels comprises fastening the first plurality of composite panels together to yield the first partial composite barrel section.

10. The method of claim 8, wherein the assembling comprises splicing the first plurality of composite panels with flex track fastener drilling and installing devices.

11. The method of claim 8, wherein the assembling comprises fastening the first plurality of composite panels with a butt splice and a splice plate.

12. The method of claim 8, wherein the first partial composite barrel section is an upper half barrel section.

13. The method of claim 8, the fabricating the second plurality of composite panels comprising:
   assembling a second layup of composite material.

14. The method of claim 13, wherein the fabricating the second plurality of composite panels comprises:
   concurrently with the assembling the second layup of composite material, assembling at least two of the additional second layup of composite material.

15. The method of claim 13, the fabricating the second plurality of composite panels further comprising:
   concurrently with the assembling the second layup of composite material, assembling at least one additional second layup of composite material.

16. The method of claim 15, the fabricating the second plurality of composite panels further comprising:
   heating the second layup of composite material together with the at least one additional second layup of composite material.

17. The method of claim 16, wherein the assembling the second layup of composite material comprises:
   laying up composite material on two or more second surfaces.

18. The method of claim 16, wherein the heating comprises:
   applying pressure to the second layup of composite material and the at least one additional second layup of composite material.

19. The method of claim 16, further comprising:
   assembling the second plurality of composite panels to yield the second partial composite barrel section.

20. The method of claim 19, wherein the first partial barrel section is an upper half barrel section and the second partial barrel section is a lower half barrel section.

* * * * *